United States Patent
Sugita et al.

(10) Patent No.: US 12,319,583 B2
(45) Date of Patent: *Jun. 3, 2025

(54) SODIUM BOROHYDRIDE PRODUCTION METHOD

(71) Applicant: NIPPON LIGHT METAL COMPANY, LTD., Tokyo (JP)

(72) Inventors: Kaoru Sugita, Shizuoka (JP); Yuji Oota, Shizuoka (JP); Yo Rene Abe, Shizuoka (JP); Takuma Hachisu, Tokyo (JP); Takehiro Matsunaga, Ibaraki (JP)

(73) Assignee: NIPPON LIGHT METAL COMPANY, LTD., Tokyo (JP)

( * ) Notice: Subject to any disclaimer, the term of this patent is extended or adjusted under 35 U.S.C. 154(b) by 545 days.

This patent is subject to a terminal disclaimer.

(21) Appl. No.: 17/632,082

(22) PCT Filed: Aug. 5, 2020

(86) PCT No.: PCT/JP2020/030034
§ 371 (c)(1),
(2) Date: Feb. 1, 2022

(87) PCT Pub. No.: WO2021/025068
PCT Pub. Date: Feb. 11, 2021

(65) Prior Publication Data
US 2022/0274832 A1    Sep. 1, 2022

(30) Foreign Application Priority Data

Aug. 6, 2019  (JP) .................. 2019-144883
Jul. 1, 2020   (JP) .................. 2020-114417

(51) Int. Cl.
*C01B 6/21*    (2006.01)
*C01B 3/00*    (2006.01)

(52) U.S. Cl.
CPC .............. *C01B 6/21* (2013.01); *C01B 3/00* (2013.01)

(58) Field of Classification Search
CPC ................................. C01B 6/21; C01B 3/00
See application file for complete search history.

(56) References Cited

U.S. PATENT DOCUMENTS

| 3,471,268 A | 10/1969 | Claude et al. |
| 3,505,035 A | 4/1970 | Horn et al. |

(Continued)

FOREIGN PATENT DOCUMENTS

| CN | 101195489 A | 6/2008 |
| CN | 101407918 | 4/2009 |

(Continued)

OTHER PUBLICATIONS

Korean Office Action (KROA) dated Jan. 4, 2024 issued in Korean patent application No. 10-2022-7003171 and its English machine translation.

(Continued)

*Primary Examiner* — Ian A Rummel
*Assistant Examiner* — Eric Scott Sherman
(74) *Attorney, Agent, or Firm* — RANKIN, HILL & CLARK LLP

(57) ABSTRACT

A sodium borate, aluminum powder and fluoride powder are mixed together in a hermetic vessel filled with hydrogen gas, and the mixture is reacted at not less than 410° C. and not more than 560° C. to produce sodium borohydride.

16 Claims, 14 Drawing Sheets

(56) References Cited

U.S. PATENT DOCUMENTS

| | | | |
|---|---|---|---|
| 6,358,488 | B1 | 3/2002 | Suda |
| 2007/0128509 | A1 | 6/2007 | Hong |
| 2009/0214409 | A1 | 8/2009 | Chin et al. |
| 2011/0286913 | A1 | 11/2011 | Lugtigheid |
| 2017/0183236 | A1 | 6/2017 | Yoshizaki |
| 2022/0274832 | A1 | 9/2022 | Sugita et al. |

FOREIGN PATENT DOCUMENTS

| | | | | |
|---|---|---|---|---|
| CN | 101407919 | A | | 4/2009 |
| CN | 101519187 | A | | 9/2009 |
| CN | 101519188 | A | | 9/2009 |
| CN | 102300804 | A | | 12/2011 |
| CN | 104086576 | A | | 10/2014 |
| CN | 105502292 | A | | 4/2016 |
| CN | 106414314 | A | | 2/2017 |
| CN | 106477523 | A | | 3/2017 |
| CN | 107311110 | A | | 11/2017 |
| CN | 108545699 | A | | 9/2018 |
| EP | 1914198 | A2 | | 4/2008 |
| EP | 3156364 | A1 | | 4/2017 |
| EP | 4011825 | A1 | | 6/2022 |
| GB | 790164 | A | | 2/1958 |
| GB | 832049 | A | | 4/1960 |
| GB | 879446 | A | | 10/1961 |
| GB | 1059622 | A | | 2/1967 |
| JP | 2809666 | B2 | | 7/1998 |
| JP | 2004-10446 | A | | 1/2004 |
| JP | 2004010446 | | * 1/2004 | ............ Y02E 60/50 |
| JP | 2006104055 | A | | 4/2006 |
| JP | 2006143537 | A | | 6/2006 |
| JP | 2014181174 | A | | 9/2014 |
| JP | 5839337 | B1 | | 1/2016 |
| JP | 2019189483 | A | | 10/2019 |
| KR | 10-1853745 | | | 5/2018 |
| RU | 2689587 | C1 | | 5/2019 |
| SU | 230108 | A1 | | 2/1969 |
| WO | 2015/190403 | A1 | | 12/2015 |
| WO | 2015190004 | A1 | | 12/2015 |
| WO | 2021/025068 | A1 | | 2/2021 |

OTHER PUBLICATIONS

Chinese Office Action (CNOA) dated Mar. 24, 2023 for Chinese Patent Application No. 202080054489.4; English machine translation.
Wei, "Study on Anode Nanocatalysts for Direct Borohydride-Hydrogen Peroxide Fuel Cell", Chinese Master's Theses Full-text Database (CNFD), Engineering Technology Part I, 2016; English abstract, Cited in CNOA.
U.B. et al., "Aluminum chloride for accelerating hydrogen generation from sodium borohydride", Journal of Power Sources 192, Elsevier, 2009, pp. 310-315; Cited in CNOA.
Australian Office Action (AUOA) dated Dec. 21, 2022 issued in Australian patent application No. 2020325127.
Jianfeng, Mao et al., "Recent Advances in the Use of Sodium Borohydride as a Solid State Hydrogen Store", Energies, 2015, vol. 8, pp. 430-453; Cited in AUOA.
Russian Office Action (RUOA) dated Sep. 13, 2022 for Russian Patent Application No. 2022102396; English translation.
Martelli et al., "Stability and Decomposition of NaBH4", The Journal of Physical Chemistry C, 2010, vol. 114, No. 15, pp. 7173-7177.
International Search Report (ISR) dated Oct. 13, 2020 filed in PCT/JP2020/030035.
Taiwanese Office Action (TWOA) dated Mar. 22, 2021 Taiwanese Patent Application No. 109126352 and its English machine translation.
Indian Office Action (INOA) dated Mar. 15, 2022 for Indian Patent Application No. 202247003185.
Russian Office Action (RUOA) dated Sep. 21, 2022 for Russian Patent Application No. 2022102387; English translation.
Chinese Office Action (CNOA) dated Mar. 27, 2023 for CN202080054242.2; English machine translation.
Liu et al., "Preparation of Sodium Borohydride and Hydrogen Production by Hydrolysis", Chemical Industry and Engineering Progress, 2009, vol. 28, pp. 208-213 and its English machine translation, total 18 pages.
Taiwanese Office Action issued Nov. 4, 2022 in Taiwanese Application. No. 111104095 and its English machine translation.
Taiwanese Examination opinion notification issued on Oct. 6, 2022 for Taiwanese application No. 111103650 and its English machine translation.
International Search Report (ISR) dated Apr. 5, 2022 filed in PCT/JP2022/002731.
International Search Report (ISR) dated Apr. 5, 2022 filed in PCT/JP2022/002734.
Extended European Search Report (EESR) dated Aug. 10, 2023 and issued in European Patent Application No. 20850821.8.
Extended European Search Report (EESR) dated Aug. 10, 2023 and issued in European Patent Application No. 20850574.3.
Australian Office Action (AUOA) dated in Jul. 21, 2023 and issued in Australian application No. 2020327321.
Liu et al., "Sodium Borohydride Synthesis by Reaction of Na2O contained Sodium Borate with Al and Hydrogen", Energy & Fuels, 2007, vol. 21, No. 3, pp. 1707-1711; Cited in Specification.
Taiwanese Office Action (TWOA) dated Feb. 19, 2021 for corresponding Taiwanese Patent Applicatoin No. 109126355 and its English machine translation.
International Search Report (ISR) dated Oct. 13, 2020 filed in PCT/JP2020/030034.
Korean Written Decision on Registration dated Sep. 25, 2024 for Korean Application No. 10-2022-7003171 and its English machine translation.
Extended European Search Report (EESR1) dated Apr. 23, 2025 for European Application No. 22749558.7.
Extended European Search Report (EESR2) dated Apr. 23, 2025 for European Application No. 22749559.5.

* cited by examiner

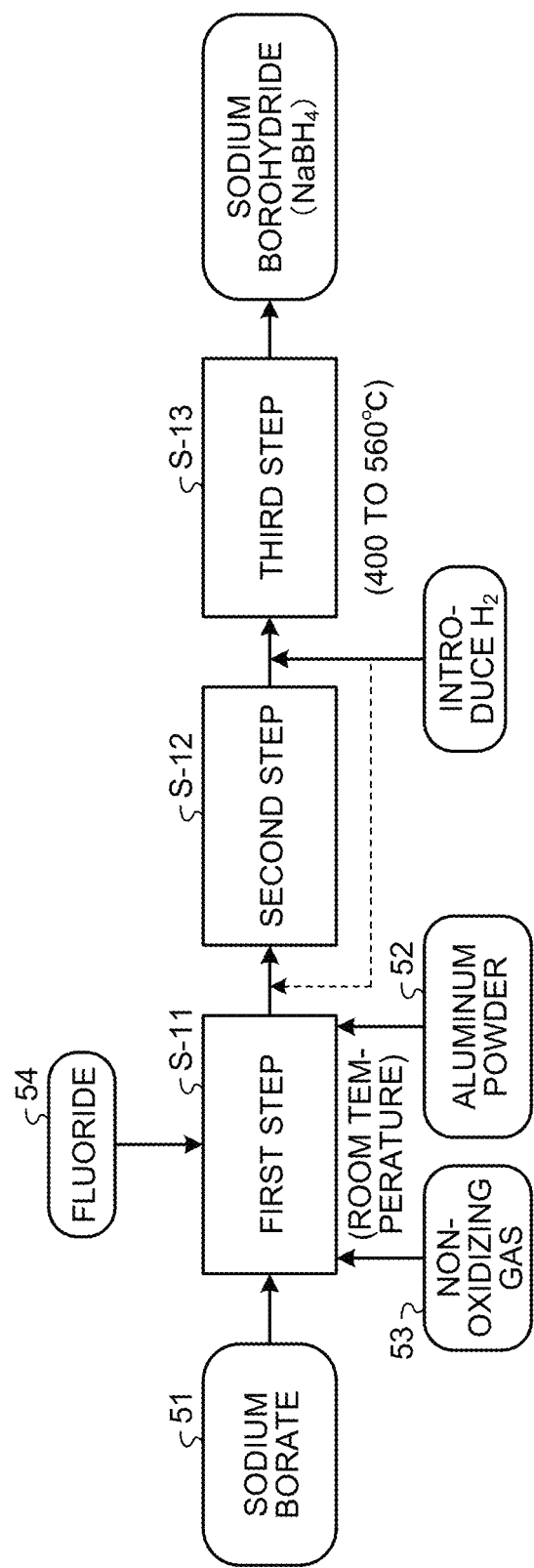

SODIUM BOROHYDRIDE PRODUCTION METHOD

FIELD

The present invention relates to a sodium borohydride production method, and more specifically to a method for producing sodium borohydride from sodium metaborate.

BACKGROUND

Hydrogen fuel has attracted attention as an energy alternative to petroleum fuels. Sodium borohydride (SBH) is a promising hydrogen carrier for hydrogen storage and transport and also as a hydrogen source. The social proliferation of sodium borohydride as a hydrogen carrier requires the establishment of an optimum method for the production of sodium borohydride with mass-production technique in mind.

Sodium borohydride production processes have been conventionally studied. For example, Patent Literature 1 discloses a method for producing sodium borohydride by reacting a trialkyl borate with sodium aluminum hydride.

Patent Literature 2 discloses a method for producing sodium borohydride that includes a step of reacting sodium metaborate and granular aluminum under a hydrogen atmosphere, while rolling and milling the sodium metaborate and the granular aluminum using a milling medium, to obtain sodium borohydride.

Furthermore, Non-Patent Literature 1 discloses a method for producing sodium borohydride in which sodium diborate ($Na_4B_2O_5$) and sodium oxide ($Na_2O$) are reacted with aluminum and hydrogen in the molten state at a high temperature (855 K (581° C.), preferably 873 K (599° C.)) to give sodium borohydride.

CITATION LIST

Patent Literature

Patent Literature 1: JP 2809666 B
Patent Literature 2: WO 2015/190403 A

Non-Patent Literature

Non-Patent Literature 1: Bin Hong LIU, et al., "Sodium Borohydride Synthesis by Reaction of $Na_2O$ contained Sodium Borate with Al and Hydrogen", Energy & Fuels, 2007, Vol. 21, No. 3, pp. 1707-1711

SUMMARY

Unfortunately, the technique proposed in Patent Literature 1 has a drawback in that the production process is complicated due to the need of the synthesis, beforehand, of the trialkyl borate from boric acid, and of the sodium aluminum hydride from sodium, aluminum and hydrogen.

In the technique proposed in Patent Literature 2, a reaction portion rotatably disposed in a cylindrically shaped reaction vessel is charged with dried anhydrous sodium metaborate ($NaBO_2$) and aluminum grains having a diameter of about 3 mm; a milling medium (steel spheres having a diameter of about 30 mm) is placed in the reaction vessel; and the materials are reacted while being rolled and milled to give sodium borohydride. With the extension in the rolling and milling time, the aluminum particles are milled to such an extremely small size that further milling is difficult and the reaction stops.

In the technique proposed in Non-Patent Literature 1, sodium hydroxide is added to sodium metaborate, the mixture is heated in water to give an aqueous solution, which is then subjected to thermal dehydration to give sodium diborate ($Na_4B_2O_5$) including sodium oxide ($Na_2O$) or sodium metaborate, and this mixture is reacted in the molten state at a high pressure of 2.3 MPa. Sodium diborate needs to be heated to a high temperature (about 855 K (581° C.), preferably 873 K (599° C.) to melt. To obtain a high reaction yield of 65.8%, the molar ratio of sodium metaborate to sodium oxide needs to be 3:2. If this molar ratio is lowered, the reaction yield decreases sharply and drops to zero for pure sodium metaborate that remains solid at the aforementioned temperature.

The present invention has been made in light of the problems in the art discussed above. It is therefore an object of the present invention to provide a sodium borohydride production method capable of synthesizing sodium borohydride with a simple configuration.

A sodium borohydride production method according to a first aspect has a feature comprising: mixing a sodium borate, aluminum powder and powder of a fluoride together in a hermetic vessel filled with hydrogen gas, and reacting the mixture at not less than 410° C. and not more than 560° C.

In the first aspect, the sodium borate may be one or more selected from sodium metaborate, sodium tetraborate and sodium diborate.

In the first aspect, the fluoride may be one or more selected from sodium fluoride (NaF), sodium hexafluoroaluminate ($Na_3AlF_6$), potassium fluoride (KF), potassium aluminum fluoride ($KAlF_4$), aluminum fluoride ($AlF_3$) and lithium fluoride (LiF).

In the first aspect, a molar ratio of aluminum in the aluminum powder to boron in the sodium borate may be not less than 4/3.

In the first aspect, a molar ratio of any alkali metal plus sodium in the sodium borate to boron in the sodium borate may be in a range of more than 1 and not more than 4.

The first aspect can provide a sodium borohydride production method without requiring any large-scale or complicated facility.

BRIEF DESCRIPTION OF DRAWINGS

FIG. 1 is a process chart of the synthesis of sodium borohydride (SBH) from a sodium borate as an ingredient;

Table 1 lists the configurations in which diboron trioxide ($B_2O_3$) and sodium oxide ($Na_2O$) are present. As listed in Table 1, sodium borate ingredients A to F (hereinafter, also referred to as the "ingredients A to F") each include a sodium borate composed of diboron trioxide ($B_2O_3$) and sodium oxide ($Na_2O$) that occur in the specified configuration when sodium oxide ($Na_2O$) is increased to borax (sodium tetraborate: $Na_2B_4O_7$) as the starting material.

TABLE 1

| Ingredients | A | B | C | D | E | F |
|---|---|---|---|---|---|---|
| Sodium borate | Borax $Na_2B_4O_7$ | | Sodium metaborate ($NaBO_2$) | | Sodium diborate ($Na_4B_2O_5$) | |
| Na/B Configurations | Na/B = 0.5 $B_2O_3$— $Na_2O$— $B_2O_3$ | 0.5 < Na/B < 1 Mixture of $B_2O_3$— $Na_2O$—$B_2O_3$ and $N_2O$ | Na/B = 1 $B_2O_3$— $Na_2O$ | 1 < Na/B < 2 Mixture of $Na_2O$—$B_2O_3$— $Na_2O$ and $B_2O_3$—$Na_2O$ | Na/B = 2 $Na_2O$— $B_2O_3$— $Na_2O$ | 2 < Na/B Mixture of $Na_2O$—$B_2O_3$— $Na_2O$ and $Na_2O$ |

Figure 10A:
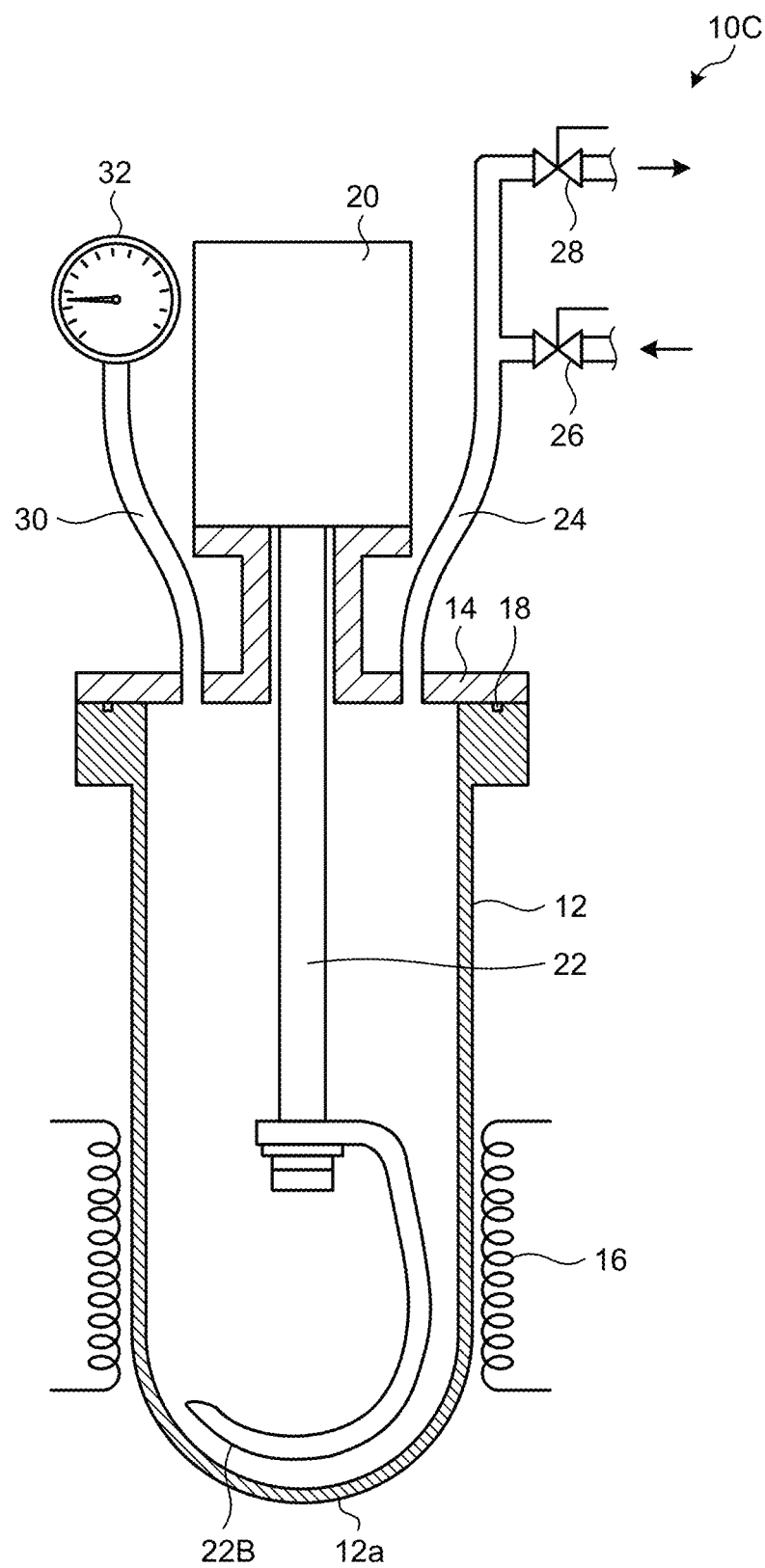
Figure 10B:
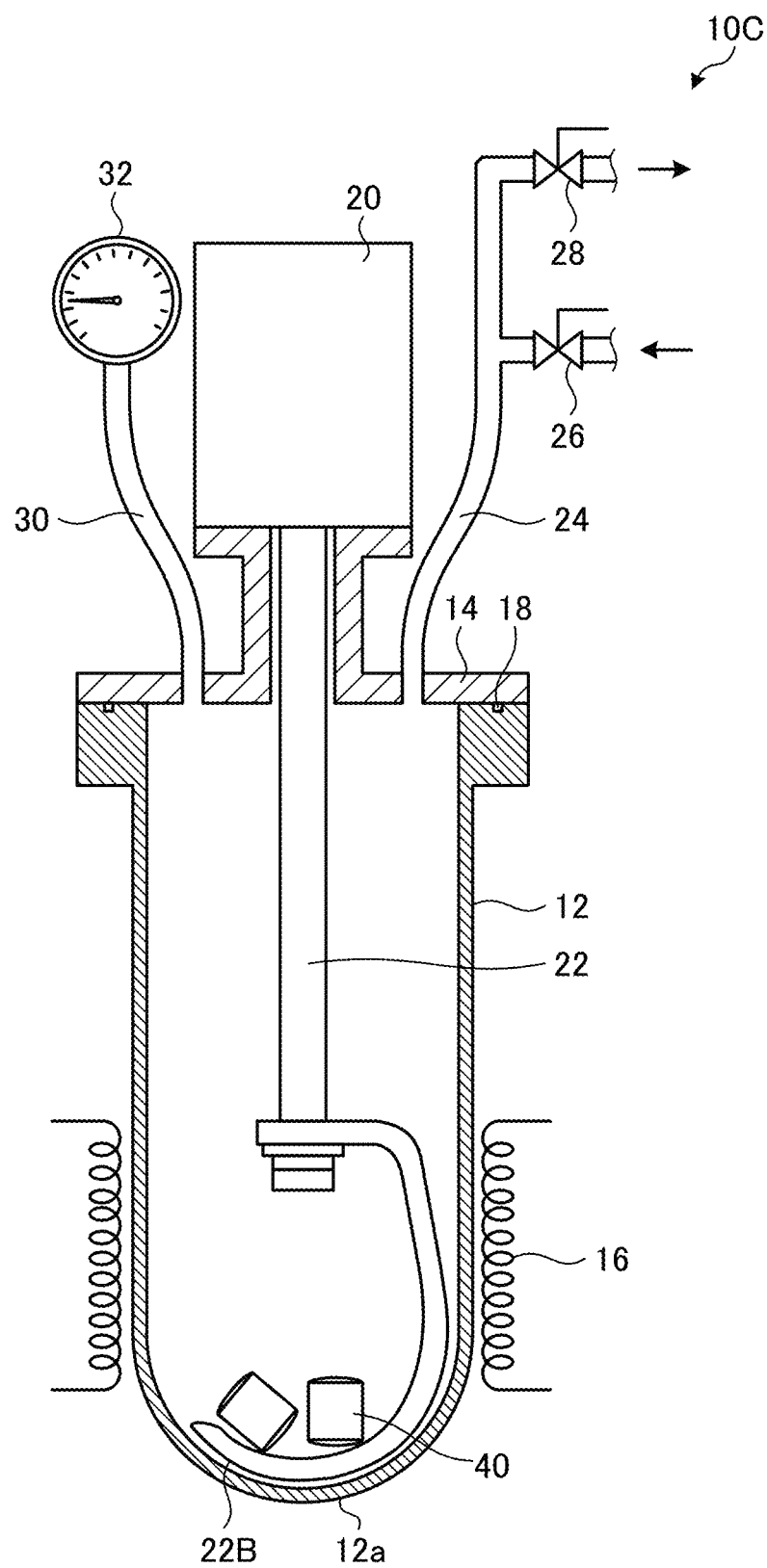
Figure 11:
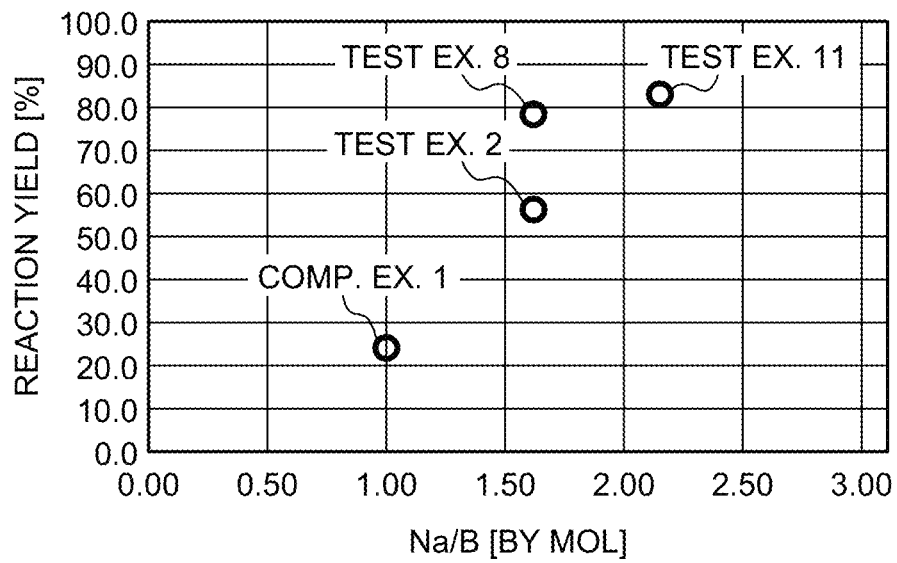
Figure 12:
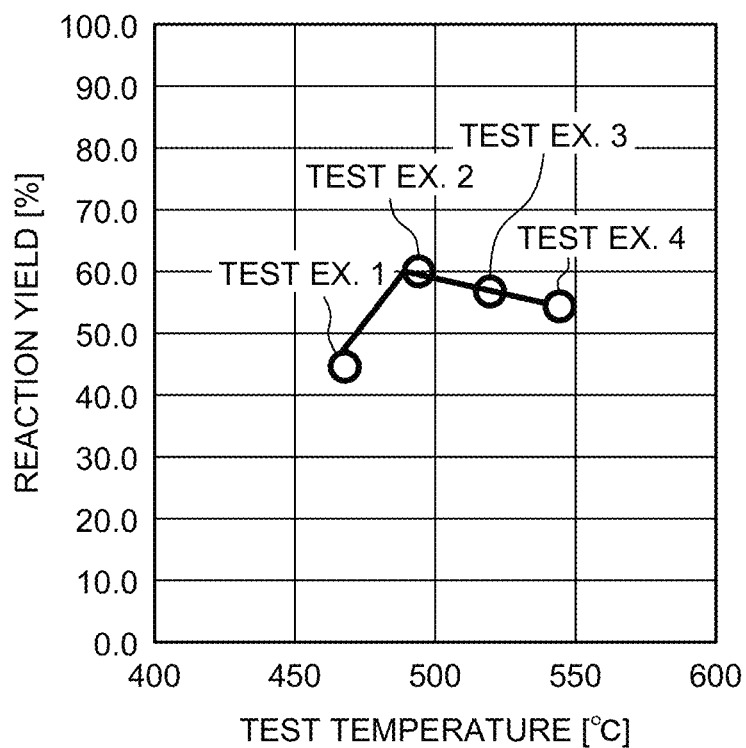
Figure 13:
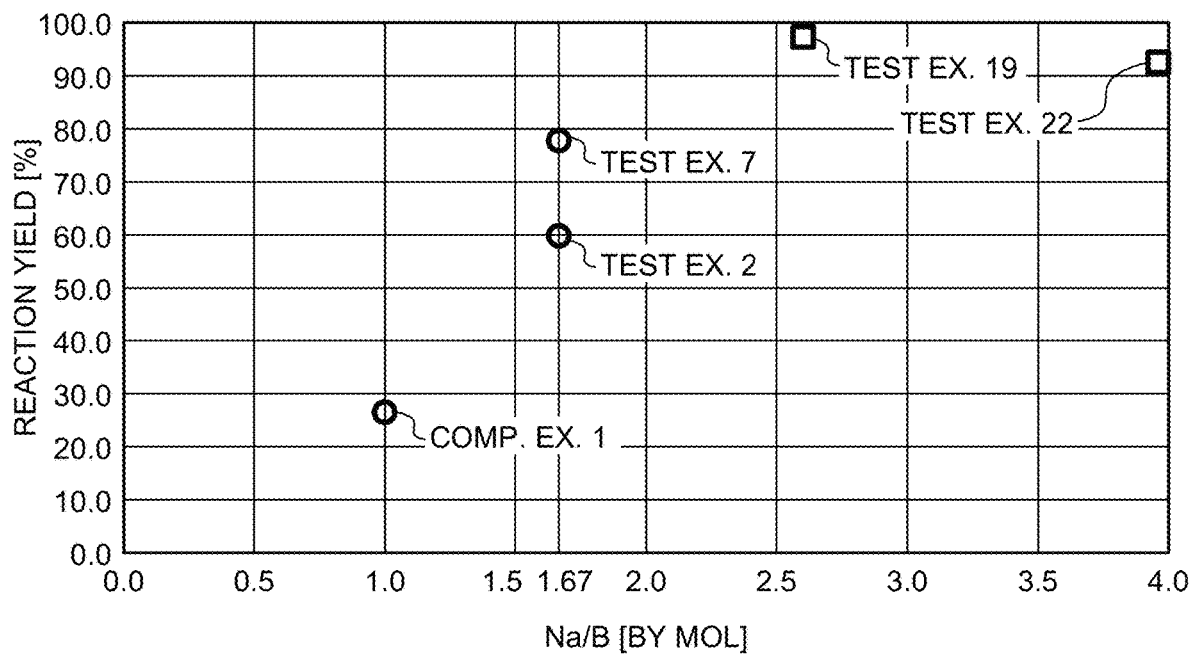
Figure 14:
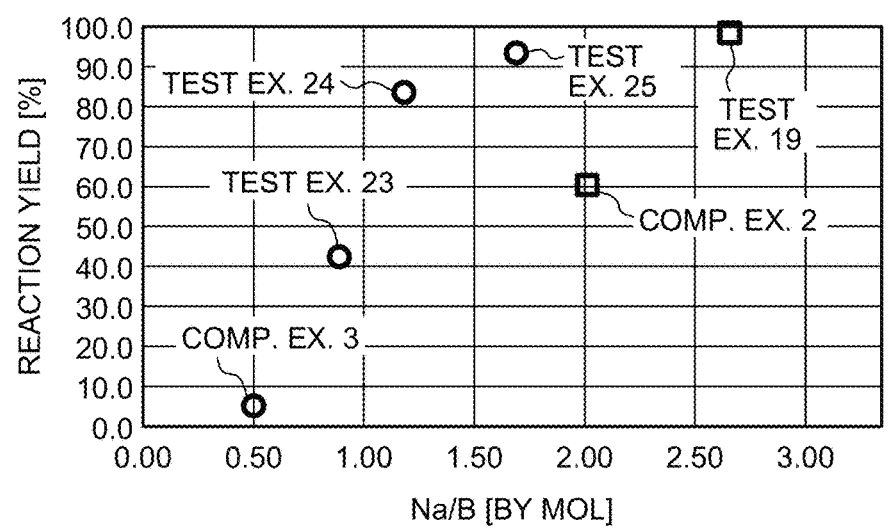
Figure 15A:
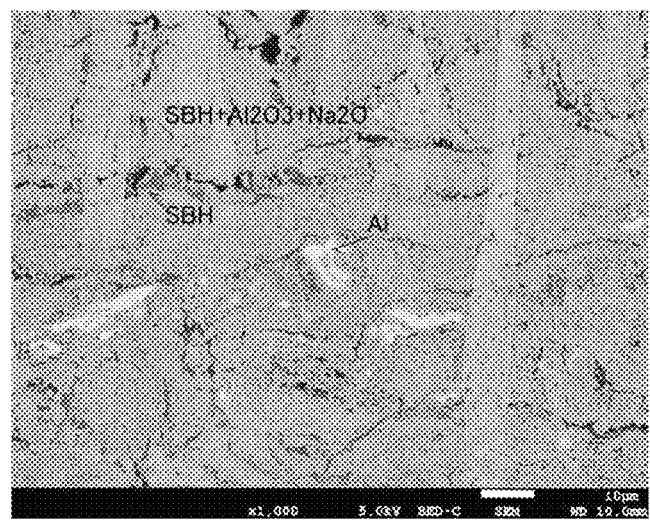
Figure 15B:
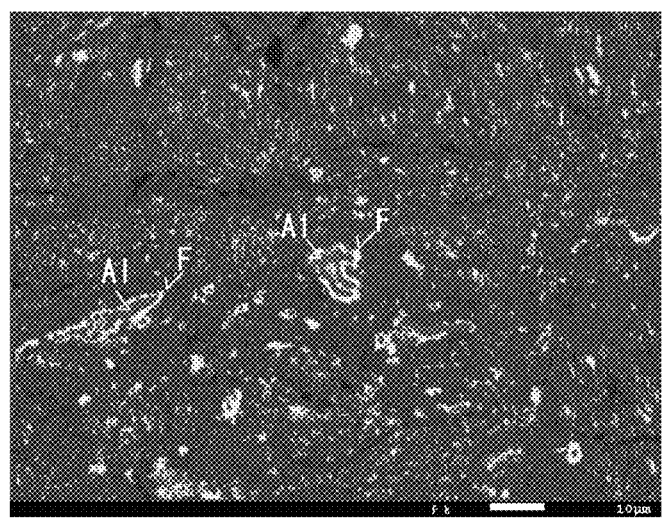

FIG. 10A is a partial sectional view illustrating another example of hermetic vessels used in an embodiment;

FIG. 10B is a partial sectional view illustrating another example of hermetic vessels used in an embodiment;

FIG. 11 is a graph illustrating effects of the addition of a fluoride to sodium metaborate;

FIG. 12 is a graph illustrating varied temperatures for the addition of a fluoride to sodium metaborate;

FIG. 13 is a graph illustrating effects of the addition of a fluoride to sodium metaborate or sodium tetraborate;

FIG. 14 is a graph illustrating effects of the addition of a fluoride to sodium tetraborate or sodium diborate;

FIG. 15A is a SEM backscattered electron image of products at the completion of reaction in Test Example 19; and FIG. 15B is a fluorine mapping FKα X-ray image by SEM.

DESCRIPTION OF EMBODIMENTS

First Embodiment

FIG. 1 is a process chart of the synthesis of sodium borohydride (SBH) from a sodium borate as an ingredient.

In a sodium borohydride production method according to the first embodiment, a sodium borate, aluminum powder and fluoride powder are mixed together in a hermetic vessel filled with hydrogen gas, and the mixture is reacted at not less than 410° C. and not more than 560° C. The sodium borate and the aluminum powder undergo the reaction each in the solid state. As illustrated in FIG. 1, the sodium borohydride production method according to the first embodiment includes a first step (S-11) to a third step (S-13).

A sodium borate 51 as a borate ingredient at the first step is a double oxide obtained from borax as a starting material by the addition of sodium hydroxide. Specifically, the sodium borate is such a double oxide including diboron trioxide ($B_2O_3$) and sodium oxide ($Na_2O$) with a Na/B ratio in the range of 0.5 to 3.0. Specific examples of the sodium borates include borax (sodium tetraborate: $Na_2B_4O_7$), sodium metaborate ($NaBO_2$ (=$Na_2B_2O_4$)) and sodium diborate ($Na_4B_2O_5$), but are not limited thereto as will be described below.

In Table 1, the ingredient A is borax. Borax exists in the form of sodium tetraborate (anhydrous), sodium tetraborate (pentahydrate) and sodium tetraborate (decahydrate). Borax decahydrate occurs naturally as crystal. Thus, the ingredient A may be isolated as crystal by crystallizing the hydrate from a solution, and separating and drying the hydrate.

The ingredient C is sodium metaborate ($NaBO_2$ (=$Na_2B_2O_4$)), which is a sodium borate with Na/B (by mol)=1.0 obtained by adding sodium hydroxide (NaOH ($Na_2O \cdot H_2O$)) to borax. Sodium metaborate that is the ingredient C may be isolated as crystal by crystallizing the hydrate from a solution, and separating and drying the hydrate.

Here, Na/B (by mol) is the molar ratio of the total of any alkaline metal plus sodium in the sodium borate, relative to boron (hereinafter, also referred to as "Na/B").

The ingredient E is sodium diborate ($Na_4B_2O_5$) that is a sodium borate with Na/B=2.0 obtained by adding sodium hydroxide (NaOH($Na_2O \cdot H_2O$)) to sodium metaborate. Sodium diborate that is the ingredient E cannot be crystallized from a hydrate solution and thus cannot be isolated as crystal from an aqueous solution.

Furthermore, the ingredient B is a sodium borate with 0.5<Na/B<1.0. This borate is principally composed of borax at first, and gradually comes to contain an increased proportion of sodium oxide ($Na_2O$). The ingredient B is a mixture of borax ($Na_2B_4O_7$) and sodium oxide ($Na_2O$).

The ingredient D is a sodium borate with 1.0<Na/B<2.0. This borate is principally composed of sodium metaborate at first, and gradually comes to contain an increased proportion of sodium oxide ($N_2O$) to be a mixture of sodium metaborate ($NaBO_2$) and sodium diborate ($Na_4B_2O_5$). The ingredient D is a liquid containing the hydrate, but the hydrate cannot be crystallized and thus cannot be isolated as crystal.

The ingredient F is a sodium borate with 2.0<Na/B. This borate is principally composed of sodium diborate ($Na_4B_2O_5$) at first, and gradually comes to contain an increased proportion of sodium oxide ($Na_2O$) to be a mixture of sodium diborate ($Na_4B_2O_5$) and sodium oxide ($Na_2O$). Sodium diborate is the main crystal of this ingredient F, but cannot be crystallized from an aqueous solution and thus cannot be isolated as sodium diborate crystal. At a high value of Na/B, excess sodium oxide ($Na_2O$) occurs. When Na/B is 2 or greater, the ingredient F exists in the free state.

From the foregoing, the sodium borate in the present invention is a double oxide containing diboron trioxide ($B_2O_3$) and sodium oxide ($Na_2O$) in a specific ratio. As described above, for example, sodium metaborate ($NaBO_2$) is the ingredient C (Na/B (by mol)=1.0; $Na_2O:B_2O_3$=1:1), and sodium diborate ($Na_4B_2O_5$) is the ingredient E (Na/B (by mol)=2.0; $Na_2O:B_2O_3$=2:1). However, other mixtures of $Na_2O$ and $B_2O_3$ in an appropriate ratio that have no specific names may also be used as ingredients in the production of sodium borohydride (SBH).

In the present invention, Na/B (by mol) in the sodium borate is preferably in the range of more than 0.5 and not more than 6, and more preferably in the range of more than 1.0 and not more than 3.

Steps will be described in detail below. The sodium borate used at the steps hereinbelow is an isolated crystal of sodium metaborate.

First Step

At the first step (5-11), a sodium borate 51 that is sodium metaborate with a particle size of not more than 100 μm, aluminum powder 52 and a fluoride 54 are charged into a hermetic vessel, and thereafter a non-oxidizing gas 53 is introduced into the hermetic vessel to fill the inside with the non-oxidizing gas atmosphere. The hermetic vessel may be already filled with the non-oxidizing gas before the charging of the ingredients.

The first step mainly provides the ingredients and charges them.

At the first step, the inside of the hermetic vessel is filled with a non-oxidizing gas to prevent the attachment of water in the air to the sodium borate and to the oxide film on the surface of aluminum. The hermetic vessel may be filled with a non-oxidizing gas before or after the ingredients are charged into the hermetic vessel.

Here, the non-oxidizing gas 53 may be, for example, hydrogen gas or a rare gas (such as, for example, helium gas or argon gas). Alternatively, the first step may be a step in which a sodium borate with a particle size of not more than 100 μm and aluminum are charged into a hermetic vessel, and the hermetic vessel is evacuated to vacuum before or after the charging of the ingredients.

The hermetic vessel that is used is one that has heat resistance and pressure resistance enough to withstand high temperatures (for example, 560° C.) and high pressures (for example, 10 MPa) and that has a hermetic space to be filled with a gas. Use may be made of a vessel at least equipped with a stirring device.

Details of the hermetic vessel will be described later.

The sodium borate as an ingredient is preferably one or more selected from sodium metaborate, sodium tetraborate and sodium diborate.

Hereinbelow, an embodiment will be described taking sodium metaborate powder as an example of the sodium borates.

In the present embodiment, the sodium metaborate powder has a particle size of not more than 100 μm. If the particle size of the sodium metaborate powder is larger than 100 μm, the efficiency in the synthesis of sodium borohydride may be lowered. The sodium metaborate powder is an ingredient obtained by crushing sodium metaborate to a certain degree of fineness, screening the particles through a sieve having 100 μm openings, and collecting the particles that have passed through the sieve. To attain further enhancements in the efficiency in the synthesis of sodium borohydride, it is preferable to use sodium metaborate powder having a smaller particle size. Such sodium metaborate powder may be obtained by screening through a sieve having an opening size of less than 100 μm (for example, a sieve with an opening size of 50 μm or less).

At the first step, the sodium metaborate may be charged in a mass that is determined appropriately in accordance with the desired quantity of sodium borohydride to be synthesized. Incidentally, a larger mass than estimated needs to be added in view of the fact that sodium metaborate contains water and the mass of water will be lost.

The aluminum used as an ingredient may be, for example, small pieces such as powder or scraps. For example, such small pieces of aluminum may be scraps such as chips and wastes. Where possible, it is preferable to select aluminum containing small amounts of impurity metals that are more noble than aluminum.

Preferably, the aluminum that is charged has an average particle size of, for example, not less than 1 μm, and a maximum particle size of not more than 10 mm. If the average particle size of the aluminum is less than 1 μm, the particles are difficult to handle due to facilitated dust explosion, and also adhere to one another easily to form aggregates in some cases. If the average particle size is larger than 10 mm, the specific surface area per mass is so reduced that the reactive area is decreased to possibly cause a significant decrease in reaction rate at the initial stage of reaction. The average particle size is more preferably not less than 10 μm and not more than 5 mm.

The average particle size is obtained as the circular equivalent diameter determined with a laser diffraction particle size distribution analyzer.

The fluoride as an ingredient may be one or more selected from sodium fluoride (NaF), sodium hexafluoroaluminate ($Na_3AlF_6$), potassium fluoride (KF), potassium aluminum fluoride ($KAlF_4$), aluminum fluoride ($AlF_3$) and lithium fluoride (LiF). Of these, sodium fluoride that is an alkali metal fluoride is particularly preferable.

Here, the addition of the fluoride is aimed at enhancing the reaction yield of sodium borohydride. At the reaction steps, the fluoride forms an alkali aluminum fluoride layer and an alkali metal in the course of the reduction reaction of an alkali metal oxide occurring on the surface of aluminum. Sodium fluoride has a low free energy of formation and is stable, and thus the fluoride layer serves to keep the inside of the aluminum particles in the fluoride atmosphere. Furthermore, the fluoride strengthens the crystal structure of the aluminum oxide.

When sodium oxide is diffused into the aluminum oxide film, it changes to sodium aluminum dioxide. The sodium aluminum dioxide is further formed into β"-alumina by the crystallization promoting action of the fluoride.

β"-Alumina allows metal ions to be diffused therein. In particular, sodium ions are diffused easily. Thus, sodium fluoride and sodium oxide come to be able to penetrate through the β"-alumina layer.

When the sodium oxide reaches the aluminum surface, the activity of sodium ions is increased by the combination of the sodium oxide and the residual sodium fluoride layer. Next, the sodium oxide is reduced by aluminum to form metallic sodium and alumina, and the sodium bonds to hydrogen to form sodium hydride. When the surface of the aluminum particle is taken as a coast, the sodium hydride is diffused to an offshore away from the coast (to a region away from the surface of the aluminum particle, hereinafter, "offshore"), or reacts with diboron trioxide diffused thereto to form sodium borohydride and sodium oxide. The alumina bonds to the sodium oxide to form sodium aluminum dioxide, which is thereafter formed into β"-alumina releasing sodium oxide. The alumina is stabilized as β''-alumina, and the activity of aluminum ions lowers.

The fluoride and the fluoride layer increase the reductive action of aluminum in the end to promote the formation of sodium hydride, and consequently the yield of sodium borohydride is enhanced. The fluoride atmosphere contributes to the stabilization of sodium borohydride and thus allows the reaction to proceed even at a low hydrogen gas pressure. Consequently, as will be described later in Test Examples, the addition of the fluoride suppresses the decomposition of sodium borohydride during the reaction, and thus offers an enhanced reaction yield.

When the fluoride is added, sodium oxide ($Na_2O$) is diffused through the oxide film layer on the aluminum particle surface to form a sodium aluminum dioxide ($NaAlO_2$=$Na_2O \cdot Al_2O_3$) layer on the surface of aluminum, and the fluoride exerts the β''-alumina formation promoting action to allow a hard shell corresponding to β''-alumina to be formed on the aluminum particle surface.

Inside the hard shell, the sodium oxide ($Na_2O$) released by the β''-alumina formation is reduced by aluminum to form metallic sodium (Na) and aluminum oxide ($Al_2O_3$). Next, the metallic sodium (Na) is formed into sodium hydride (NaH), which further reacts with diboron trioxide ($B_2O_3$) to form sodium borohydride (SBH) and sodium oxide ($Na_2O$).

The hard shell is stable even when stirring is performed using a medium, and thus the above reactions proceed toward the inside of the aluminum particles. Specifically, the inside of the aluminum particles covered with the hard shell is in the static condition and the β''-alumina formation can proceed. If, however, the stirring is an operation that applies a harder stress such as rolling and milling, there is a risk that the hard shells may be deformed and the above reactions may be inhibited.

Sodium fluoride (NaF) promotes the conversion of $Na_2O \cdot Al_2O_3$ that is produced, into β''-alumina and thereby allows a hard shell to be formed on the periphery of the aluminum particles. Sodium ions are allowed to selectively permeate through the hard shell to give rise to an increase in the amount of sodium oxide ($Na_2O$) within the hard shell. Thus, a high sodium borohydride (SBH) conversion ratio may be obtained even at a low Na/B ratio.

Sodium aluminum oxide layers ($xNaO \cdot Al_2O_3$; 0<x<1) composed of β''-alumina ($0.17Na_2O \cdot Al_2O_3$) or β-alumina ($0.09Na_2O \cdot Al_2O_3$) are called beta-alumina solid electrolytes. The beta-alumina solid electrolytes are super ion conductors that have sodium ions distributed between two-dimensional layers made of alumina blocks, and the sodium ions move at high speed between the layers.

Next, a detailed discussion will be presented with reference to schematic reaction views (FIG. 2A to FIG. 2F) that illustrate steps for synthesizing sodium borohydride (SBH) while involving sodium fluoride (NaF) as the fluoride to attain an enhanced yield of metal oxide (sodium oxide ($Na_2O$)).

FIG. 2A to FIG. 2F are schematic reaction views illustrating steps in sodium borohydride (SBH) synthesis reaction.

Here, the fluoride (for example, sodium fluoride: NaF) is added for the purpose of, as described hereinabove, enhancing the reaction yield of sodium borohydride. The fluoride exerts two actions on aluminum. The first action is to promote the crystallization of alumina. Secondly, an alkali fluoride (for example, sodium fluoride: NaF) promotes the reduction by aluminum. An alkali oxide including a fluoride similarly exhibits a catalytic action to increase the reducing power of aluminum on an alkali oxide.

Figure 2A:
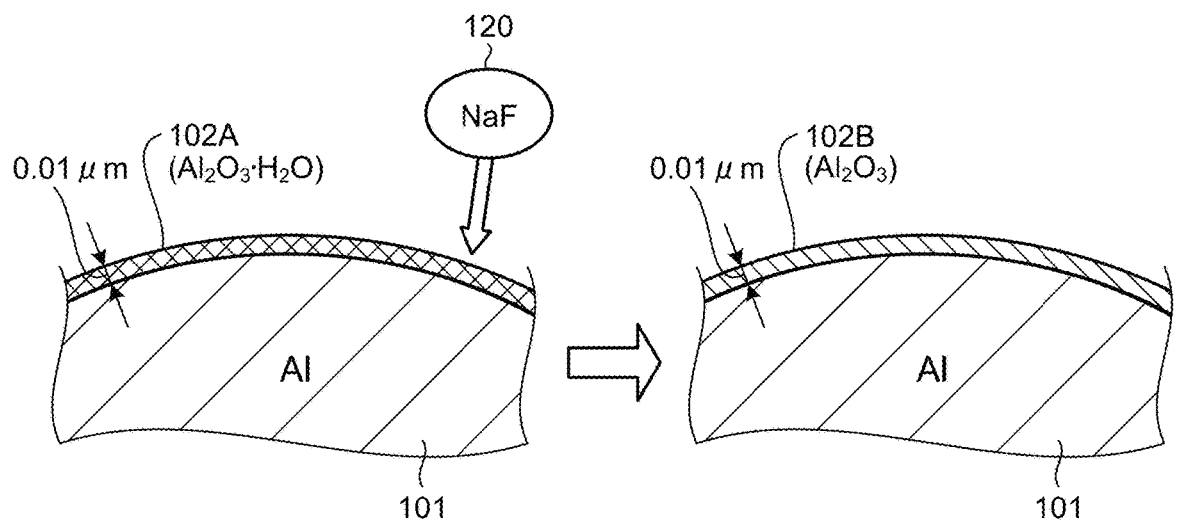
FIG. 2A is a schematic reaction view illustrating a step in sodium borohydride (SBH) synthesis reaction.

On the surface of an aluminum (Al) particle 101, as illustrated in FIG. 2A, there is an oxide film ($Al_2O_3 \cdot H_2O$) 102A formed by natural oxidation. This oxide film 102A resulting from natural oxidation is a dense layer with a thickness of about 0.01 μm. The dense oxide film ($Al_2O_3 \cdot H_2O$) 102A on the aluminum particle surface releases water at a high temperature (up to 300° C.). This, in combination with the crystallization promoting action of the sodium fluoride (NaF), results in a stronger oxide film ($Al_2O_3$) 102B.

Figure 2B:
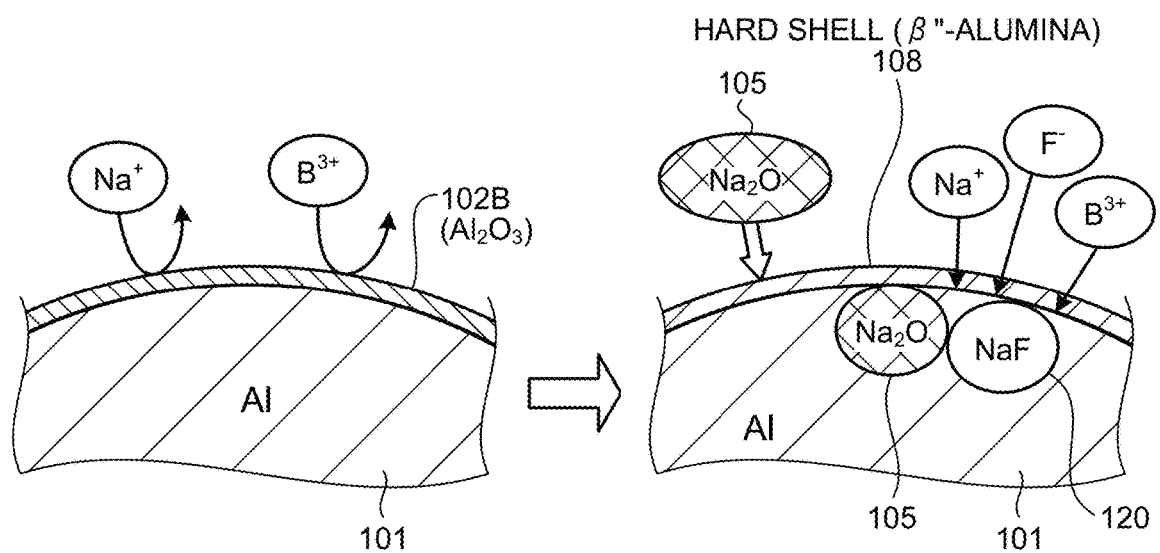
FIG. 2B is a schematic reaction view illustrating a step in sodium borohydride (SBH) synthesis reaction.

When the temperature is elevated to 400° C. or above, as illustrated in FIG. 2B, sodium oxide ($Na_2O$) in the sodium borate comes to be diffused through the strong oxide film 102B, and the sodium oxide ($Na_2O$) 105 makes an entry into the particle. The strong oxide film ($Al_2O_3$) 102B then gradually transforms over time into a hard shell 108 that is a β''-alumina layer. This β''-alumina layer is a solid electrolyte having super ion conductivity with respect to sodium ions. Other ions such as, for example, $O^{2-}$, $B^{3+}$, $Al^{3+}$ and $F^-$ can permeate through the layer, although more slowly than sodium ions.

Figure 2C:
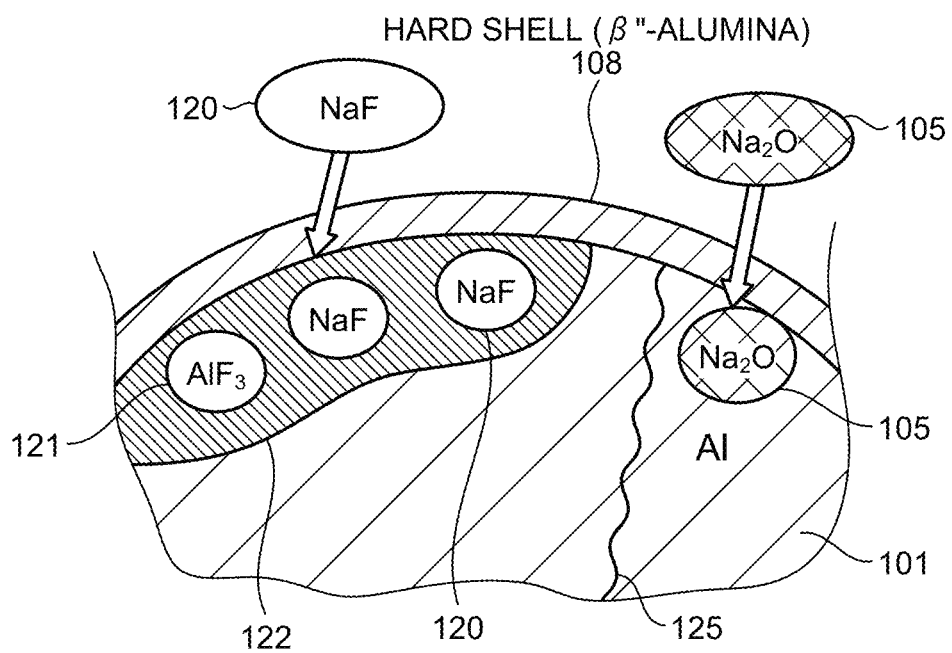
FIG. 2C is a schematic reaction view illustrating a step in sodium borohydride (SBH) synthesis reaction.

In the hard shell 108 that is a β''-alumina layer, as illustrated in FIG. 2C, sodium fluoride (NaF) 120 moves to the inside of the β''-alumina hard shell 108, and is partly reduced by aluminum into aluminum fluoride ($AlF_3$) 121 to form a sodium fluoride-aluminum fluoride layer 122. Furthermore, sodium oxide ($Na_2O$) 105 that can easily permeate through the β''-alumina layer also passes through the hard shell 108 and stays adjacent to the aluminum (Al) particle. In FIG. 2C, numeral 125 indicates a crystal defect such as a grain boundary.

Figure 2D:
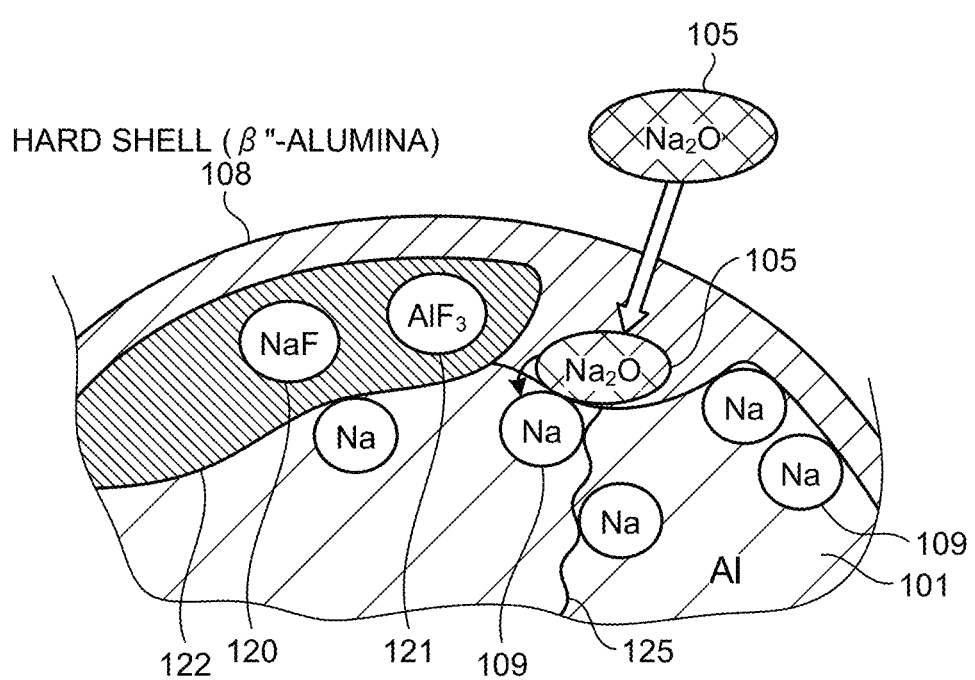
FIG. 2D is a schematic reaction view illustrating a step in sodium borohydride (SBH) synthesis reaction.
Figure 2E:
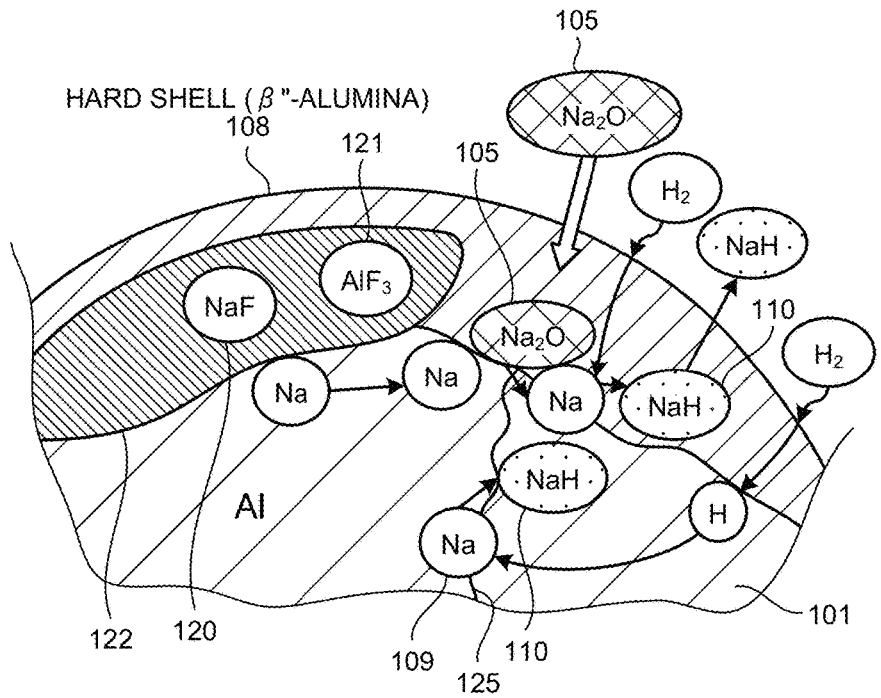
FIG. 2E is a schematic reaction view illustrating a step in sodium borohydride (SBH) synthesis reaction.

As illustrated in FIG. 2D, the sodium oxide ($Na_2O$) 105 that has passed through the β''-alumina hard shell 108 into the inside is reduced by aluminum in the presence of the fluoride to form metallic sodium (Na) 109. The metallic sodium (Na) 109 formed by the catalytic action of the fluoride is then efficiently converted to sodium hydride (NaH) 110 as illustrated in FIG. 2E. In this manner, high reaction efficiency may be obtained. These reactions are shown by the reaction formulae (1) and (2) below. The metallic sodium (Na) 109 occurring from the reduction has a low solid solubility in aluminum, and accumulates at the aluminum surface and the crystal defects 125.

$$3Na_2O + 2Al \rightarrow 6Na + Al_2O_3 \tag{1}$$

$$3NaF + Al \rightarrow 3Na + AlF_3 \tag{2}$$

As illustrated in FIG. 2E, the metallic sodium (Na) 109 accumulated in the aluminum such as at the defects 125 reacts with hydrogen (H) that has moved as hydrogen gas to the surface and as hydrogen atoms within the aluminum crystal, thus forming sodium hydride (NaH) 110 as shown by the reaction formula (3) below.

$$Na + H \rightarrow NaH \tag{3}$$

That is, in metals, hydrogen does not exist as molecules (is not covalently bonded) but does exist as hydrogen atoms (H, not $H_2$). Thus, hydrogen undergoes the reaction $H_2 \leftrightarrow H$ on the aluminum surface, which causes a slight barrier. After hydrogen reacts with the metallic sodium (Na) 109 into sodium hydride (NaH) 110, the hydride cannot stay in the metal and is discharged to the surface or to defects.

In the above reactions illustrated in FIG. 2B to FIG. 2E, the oxide film 102B transforms into β-alumina. Thus, selective permeation of sodium ions results in an increase in the concentration of sodium oxide inside the hard shell 108. The hard shell 108 also allows sodium fluoride (NaF) 120 to pass through, and the concentration of sodium fluoride 120 inside the hard shell 108 is also increased. Consequently, a sodium fluoride-aluminum fluoride layer 122 is formed inside the hard shell 108. The sodium fluoride has a high affinity for metallic aluminum and is attracted to aluminum. As a result of this, the activity of the sodium compounds is very high near the sodium fluoride-aluminum fluoride layer 122, and the sodium oxide having a higher free energy of formation than the sodium fluoride is reduced by aluminum to form metallic sodium and aluminum oxide. The metallic sodium (Na) 109 then forms sodium hydride (NaH) 110 and diffuses away.

Figure 2F:
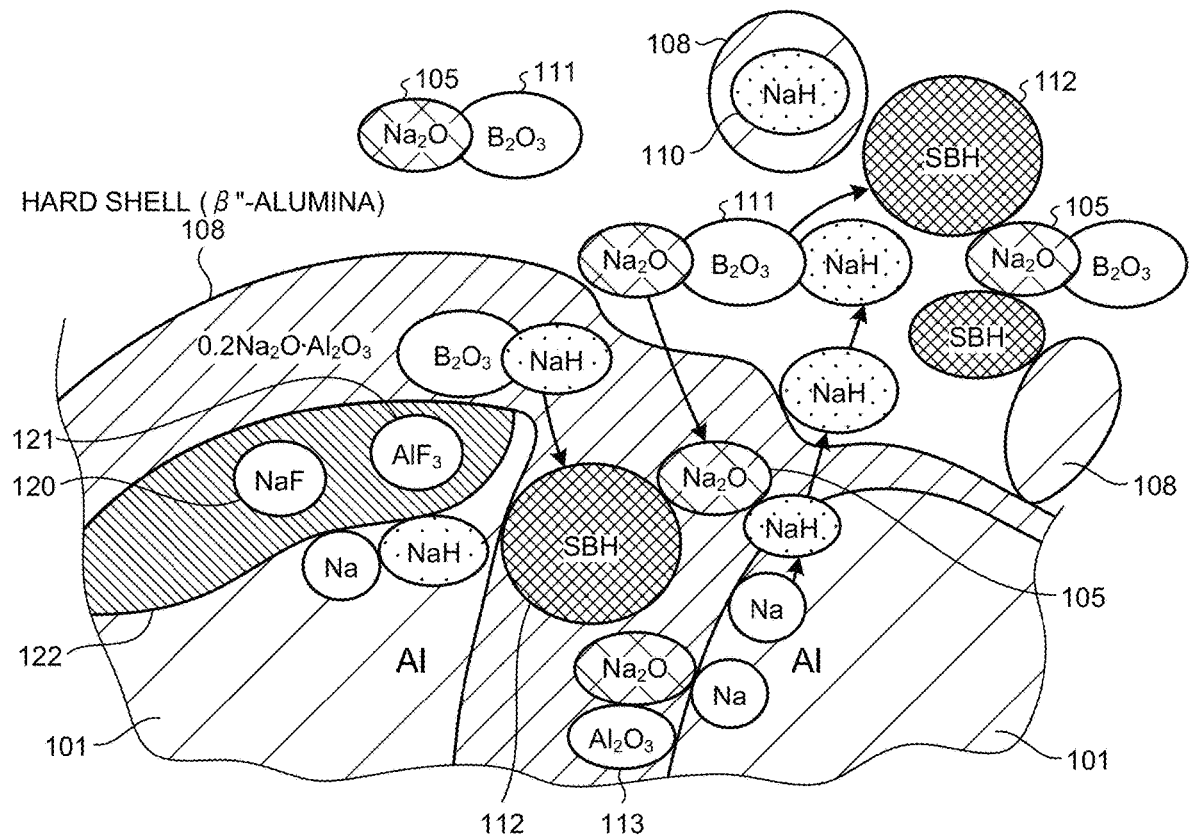
FIG. 2F is a schematic reaction view illustrating a step in sodium borohydride (SBH) synthesis reaction.

Next, as illustrated in FIG. 2F, the sodium hydride (NaH) 110 that has formed is diffused and moves from the surface of aluminum and the defects 125 of aluminum to the products phase. Similarly, diboron trioxide ($B_2O_3$) 111 moves through diffusion. When these two meet and react together, sodium borohydride (SBH) 112 and sodium oxide ($Na_2O$) 105 are formed as shown in the reaction formula (4) below.

$$8NaH + B_2O_3 \rightarrow 2NaBH_4 + 3Na_2O \quad (4)$$

These reaction products occur more on the surface of aluminum and at the defects 125 of aluminum where the concentration of sodium hydride (NaH) 110 is high. Furthermore, the sodium oxide ($Na_2O$) 105 produced by the reaction is present near the aluminum and is subsequently reduced to metallic sodium as illustrated in FIG. 2E.

Sodium hydride (NaH) 110 has a smaller molecular size and a higher diffusive migration speed than diboron trioxide ($B_2O_3$) 111, and thus can easily move offshore and can react with diboron trioxide ($B_2O_3$) 111 present there to form sodium borohydride (SBH) 112. Stirring with a medium offers a high degree of mixing of the offshore materials, and high reaction efficiency may be achieved.

Figure 3:
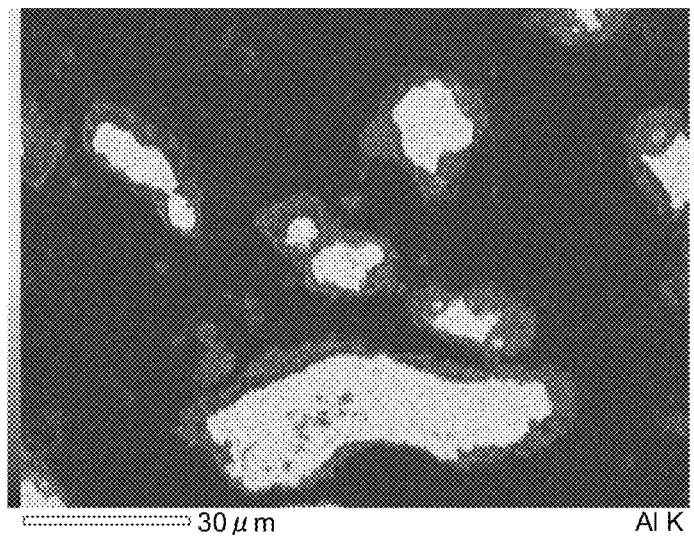
FIG. 3 is an image illustrating the result of aluminum mapping analysis by SEM-EDX.
Figure 4:
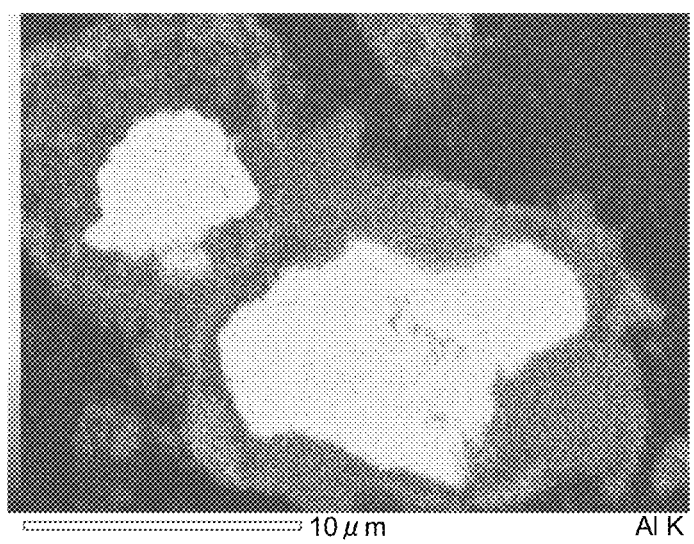
FIG. 4 is an enlarged view of the central portion of FIG. 3.
Figure 5:
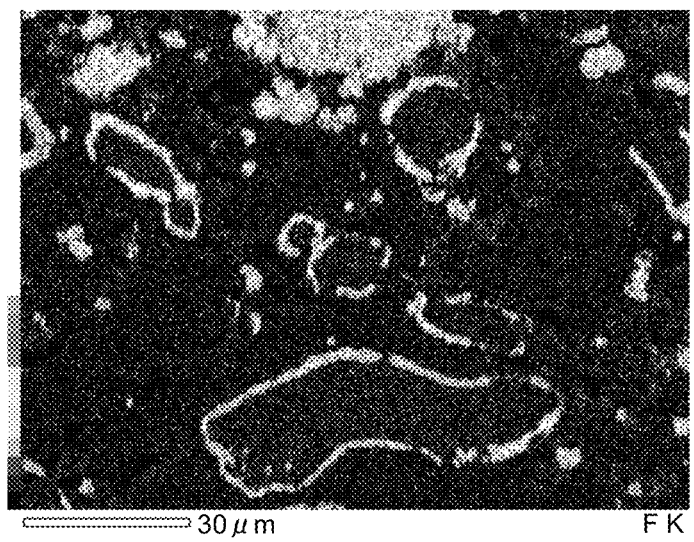
FIG. 5 is an image illustrating the result of fluorine mapping analysis by SEM-EDX.
Figure 6:
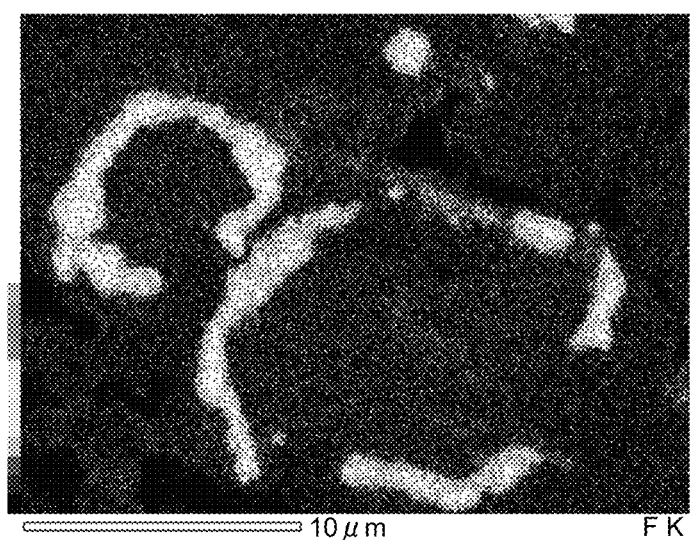
FIG. 6 is an enlarged view of the central portion of FIG. 5.
Figure 7:
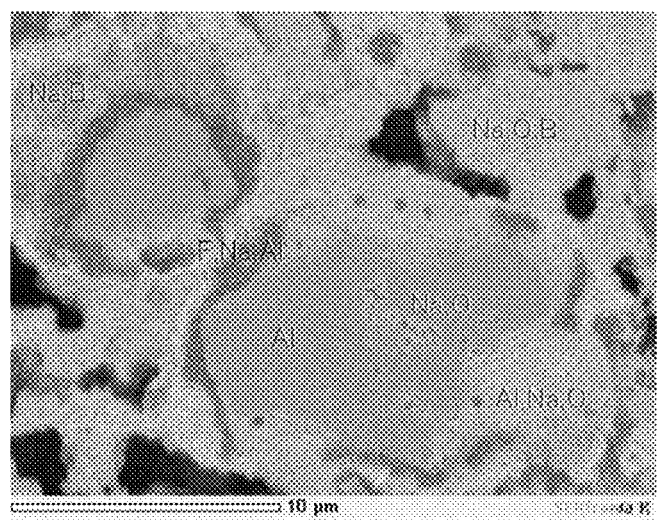
FIG. 7 is an image illustrating the result of aluminum mapping analysis by SEM-EDX.

The actual reactions will be described based on the results of mapping analysis by SEM-EDX (energy dispersive X-ray spectroscopy). In this test example, sodium metaborate powder, aluminum powder and sodium fluoride were reacted to synthesize sodium borohydride. Here, the aluminum powder was a powder with an average particle size of 30 μm, and the analysis was made when the ingredients had been stirred using a medium at a heating temperature of 495° C. and the SBH conversion ratio reached about 40% in the course of the reaction. Here, FIG. 3 is an image illustrating the result of aluminum mapping analysis by SEM-EDX (energy dispersive X-ray spectroscopy). FIG. 4 is an enlarged view of the central portion of FIG. 3. FIG. 5 is an image illustrating the result of fluorine mapping analysis by SEM-EDX. FIG. 6 is an enlarged view of the central portion of FIG. 5. FIG. 7 is an image obtained by superimposing the mapping results of Al, Na, B, F and O elements at the same position as FIG. 4.

As illustrated in FIG. 3, white regions in the center are aluminum (Al), and intermediate colors are reaction products including aluminum oxide. In FIG. 4 and FIG. 7 that are enlarged views of the central portion of FIG. 3, white aluminum is in the center, surrounded by regions that are rich in alumina ($Al_2O_3$) that is a reaction product. The gray regions are outlined by a white layer that is probably of origin from an oxide film having a slightly higher aluminum concentration. From FIG. 7, a fluoride layer is present inside the outermost peripheral oxide film layer, and forms a layer between the oxide film layer and aluminum. In FIG. 4, the aluminum is partly depressed in a bay-like shape indicating a progress of reaction, and this region corresponds to a low fluoride concentration region. It is estimated that the metal ions are diffused slowly through the fluoride layer and are diffused at a high rate through the oxide film and products.

A gray region is present in the center of the large aluminum particle in FIG. 3, and near the center of the aluminum in FIG. 4. Sodium and oxygen were detected from this region. These are aluminum defects. It is probable that sodium that had been formed was bonded with hydrogen to form sodium hydride, sodium oxide and diboron trioxide made an entry and are reduced into metallic sodium, which was then formed into sodium hydride, and part of the sodium hydride reacted with diboron trioxide to form sodium borohydride, aluminum oxide and sodium oxide. In contrast to rolling and milling in the conventional techniques, the medium stirring gives rise to substantially no deformation of aluminum.

From the mapping images illustrated in FIGS. 5 and 6, fluorine behaves in such a manner that fluorine first attaches to the periphery of the aluminum particles and thereafter migrates to the inside of the oxide film and accumulates. The reaction proceeds to the greatest extent near the fluoride layer, and therefore the fluoride layer probably plays a catalytic role.

At the first step (S-11), the temperature in the hermetic vessel at the time of the addition of the ingredients is not particularly limited as long as below 100° C. No heating is particularly required in the hermetic vessel, and thus the temperature may be ambient. To prevent the reaction of sodium metaborate with water in the air, it is necessary that the vessel be tightly closed immediately after the ingredients are charged.

In the production of sodium borohydride, aluminum is consumed by oxidation. In view of this, the aluminum is charged into the hermetic vessel at the first step in a molar ratio of aluminum to boron in sodium metaborate of not less than 4/3.

It is preferable that the amount of the aluminum powder ingredient that is charged be 20% or more larger than the molar ratio required for the reaction. Part of the extra aluminum is consumed by the reaction with water, and other part contributes to increasing the chance of contact with sodium metaborate when the aluminum ingredient is consumed as the reaction proceeds, thereby making it possible to enhance the reaction yield.

Second Step (Water Removal Step)

As illustrated in FIG. 1, the second step (S-12) is a step in which the inside of the hermetic vessel is heated to not less than 280° C. and not more than 560° C., and the residual water contained in the sodium metaborate and the aluminum powder is reacted with the aluminum and is converted into hydrogen gas and aluminum oxide.

Specifically, this step removes water from the reaction system by reacting the vaporized water, that is, the residual water in the hermetic vessel with the aluminum, or evacuating the vessel with a vacuum pump.

When this step is performed by reacting aluminum and water, aluminum oxide and hydrogen gas are formed. In more detail, vaporized steam passes through the aluminum oxide film, and the water reacts with aluminum, leaving aluminum oxide and hydrogen gas. The reaction between water and aluminum is shown by the reaction formula (5) below.

$$2Al + 3H_2O \rightarrow Al_2O_3 + 3H_2 \quad (5)$$

The oxide film on aluminum usually has defects that allow the passage of gas. The steam reaches the bare aluminum and oxidizes aluminum, generating hydrogen gas.

At the second step, the heating conditions in the vaporization process may be not less than 280° C. to ensure that the sodium metaborate hydrate will be completely dehydrated. In view of the fact that ground sodium borate powder is more prone to adsorb water and the detachment temperature is elevated, the dehydration drying is desirably performed at 400° C. or above. In this manner, the water in the atmosphere can be removed in a shorter period of time.

Third Step

In the present embodiment, as illustrated in FIG. 1, the second step (S-12) described hereinabove is followed by the third step (S-13) in which sodium borohydride is synthesized.

In the present embodiment, the reactions for synthesizing sodium borohydride are performed by bringing particles of the powder into contact with each other to react them in the solid state on the surface of aluminum, and thereafter allowing the products and the ingredients to migrate through diffusion to continue the reactions. Stirring may be performed to apply kinetic energy for helping the migration of the materials. The stirring may be performed using a stirring medium, or may be performed in such a manner that part of the ingredients is rolled and milled.

Examples of the stirring media used here include shapes such as balls and rods, with balls being preferable. The diameter of the balls is preferably larger than the particle size of the aluminum that is charged. The materials of the stirring media may be selected appropriately from existing materials such as ceramics and stainless steels. In particular, ceramic balls are free from metal contamination and are preferably used as the stirring medium. Specifically, the ceramic balls are preferably alumina balls or mullite balls. Alumina is a product formed during the synthesis reactions, but alumina or an alumina-including ceramic that has been calcined at a high temperature is stable and does not adversely affect the synthesis reactions.

Here, the diameter of the stirring medium may be about less than 30 mm, preferably not less than 2 mm and not more than 20 mm, and more preferably not less than 3 mm and not more than 10 mm.

When stirring is performed using a stirring medium, the acceptable stirring rate may range from a low rotational speed where the stirrer's circumferential velocity is about 13 cm/sec to a high rotational speed where the stirrer has a circumferential velocity of 90 cm/sec or above and the medium gains a collision energy that can deform, and roll and mill the aluminum. If, however, the circumferential velocity is 90 cm/sec or above, the aluminum is rolled and ground to thin and elongated shapes, which tend to stick to the vessel walls together with the ingredients and the products. As a result, less material is mixed and the reaction yield is lowered. Thus, the stirring rate is preferably such that the circumferential velocity of the stirrer is not more than 70 cm/sec, which does not cause a deformation of aluminum.

The amount of hydrogen in the reaction vessel decreases with the progress of the synthesis of sodium borohydride. The reaction rate may be increased by increasing the hydrogen gas pressure. The reaction here is shown by the reaction formula (6) below.

$$4Al+6H_2+3NaBO_2 \rightarrow 3NaBH_4+2Al_2O_3 \quad (6)$$

At the third step, the hermetic vessel may be the hermetic vessel used at the first step and the second step, or may be another hermetic vessel. That is, the first step to the third step may be conducted in a single hermetic vessel or in separate hermetic vessels.

At the third step, the hydrogen gas pressure is preferably maintained in the range of not less than 0.3 MPa and not more than 10 MPa, and more preferably in the range of not less than 1 MPa and not more than 10 MPa. By maintaining the hydrogen gas pressure at not less than 0.3 MPa and not more than 10 MPa, sodium borohydride may be synthesized with excellent efficiency, and facility costs may be depressed due to the freedom from the need of super-pressure-resistant reaction vessels, tools and the like.

To ensure that the reactions at the third step will proceed to a sufficient extent, the heating temperature is preferably not less than 410° C. and not more than 560° C. Heating temperatures of not less than 410° C. and not more than 560° C. offer a sufficient reaction rate, provide excellent efficiency in the synthesis of sodium borohydride, and ensure that sodium borohydride synthesized will be prevented from sublimation and will be recovered in a sufficient rate.

Sodium borohydride may be synthesized through the first step to the third step described hereinabove.

In the present embodiment discussed above, the sodium metaborate and the aluminum powder may be charged separately into the hermetic vessel in a sequential manner, or may be charged into the hermetic vessel as a mixture thereof. When these ingredients are charged as a mixture, the first step is preferably preceded by a step in which the sodium metaborate and the aluminum powder are mixed together to give a mixture, and the mixture of the sodium metaborate and the aluminum powder is preferably charged into the reaction vessel at the first step. The initial reaction rate may be increased by mixing the aluminum powder and the sodium metaborate beforehand and using the mixture of the ingredients.

When the aluminum powder and the sodium metaborate are used as a mixture, they may be dispersed and mixed together beforehand and compacted in a mold to form pellets. Pellets offer advantages such as lower hygroscopicity and easier handling than the powder form.

The fluoride and the sodium metaborate and the aluminum powder may be charged separately into the hermetic vessel in a sequential manner, or may be charged in such a manner that the fluoride and the aluminum are mixed together first to attach the fluoride to the aluminum surface, and thereafter the sodium metaborate is inserted. These may be also charged as a mixture.

By adding sodium fluoride (NaF) as the fluoride to the sodium metaborate powder, the molar ratio of any alkali metal plus sodium in the sodium borate becomes 1 or more relative to boron in the sodium borate (hereinafter, the ratio will be referred to as Na/B (by mol)), and the reaction yield of sodium borohydride may be enhanced.

Here, Na/B (by mol) is preferably in the range of more than 1 and not more than 4.

In the method of the present embodiment, the reaction system is composed of aluminum powder (solid), sodium metaborate powder (solid), fluoride (solid), and hydrogen (gas). In this reaction system, a good progress of the reactions requires two conditions. One is that the oxide film on the surface of the aluminum particles is removed, and the second is that a migration energy is supplied to render uniform the concentrations of the ingredients or the products in the solid so that the reactions will proceed.

The elimination of the influence of the oxide film initially present on aluminum requires that the oxide film on the aluminum surface be flawed by medium stirring to expose a new surface, and the ingredients be brought into contact with aluminum there to initiate the reaction, or that the sodium oxide be diffused and penetrate through the oxide film to form β''-alumina that allows metal ions to diffuse therethrough. This period of time to the start of the reaction is the induction period.

Aluminum oxide occurs once the reaction has started, but it does not form an oxide film because sodium borohydride (SBH) occurs at the same time. With no oxide film being formed, the reactions proceed in accordance with the rates of diffusion of the ingredients through the solid.

In a solid, compounds diffuse slowly. Thus, the rate of exchange between the product (NaH) formed on the aluminum surface and the ingredients depends on the distance of the region where the product (SBH) has been synthesized to the aluminum surface, and the diffusion rate. Mechanical energy by stirring is the factor that determines the magnitude of this diffusion distance.

Furthermore, the diffusion rate is a function of temperature, and therefore the reaction rate will be determined by temperature and stirring force (migration energy).

Next, some examples of the hermetic vessels that may be used in the present embodiment will be described, but the hermetic vessels in the present embodiment are not limited thereto.

Figure 8:
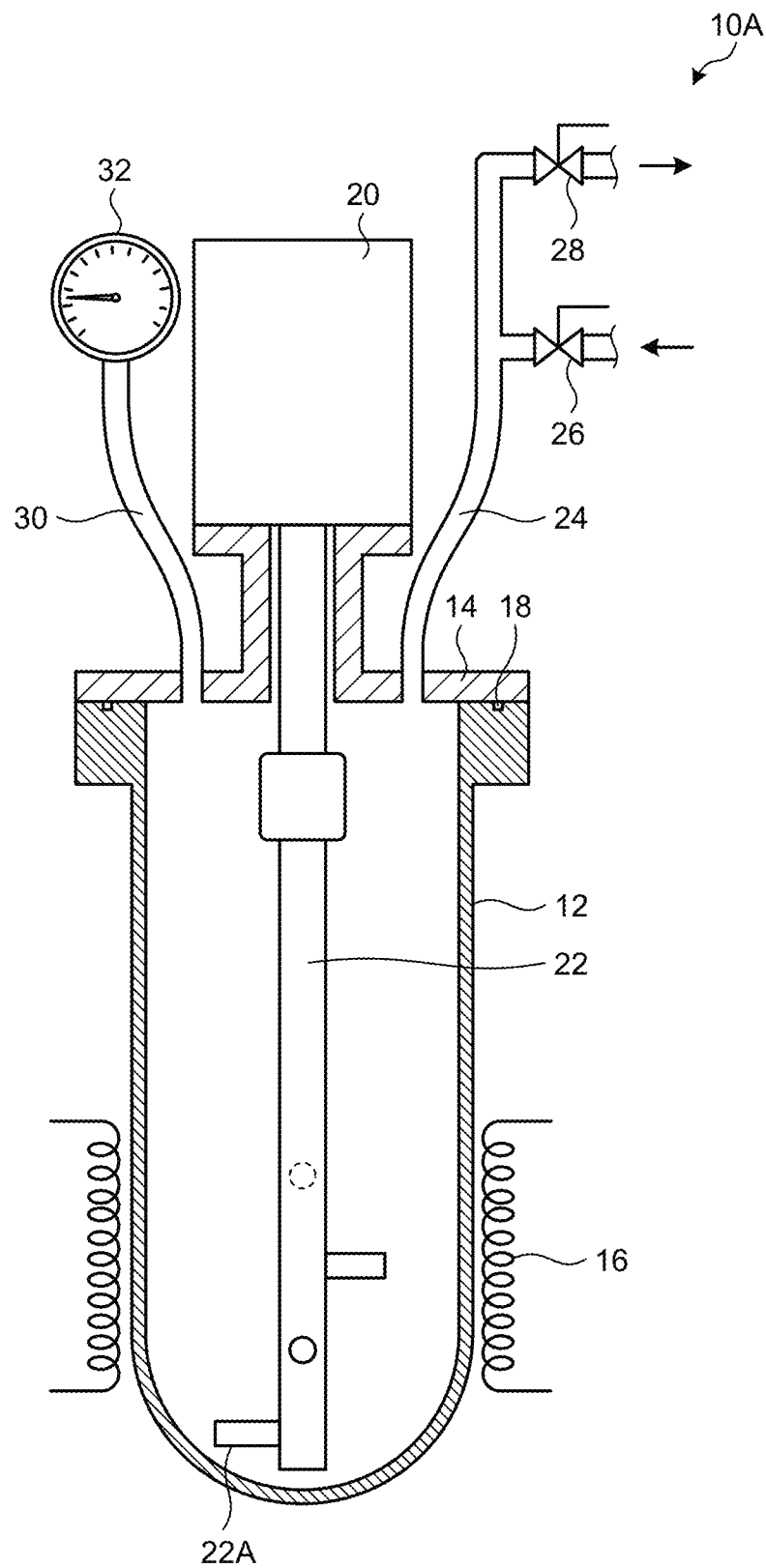
FIG. 8 is a partial sectional view illustrating an example of hermetic vessels used in an embodiment.

FIG. 8 is a partial sectional view illustrating an example of the hermetic vessels used in the present embodiment.

As illustrated in FIG. 8, a hermetic vessel 10A has a round-bottomed cylindrical main vessel body 12, and a detachable disk-shaped cover 14 that tightly seals the main vessel body 12. A temperature-adjustable heater 16 is disposed at a lower outside portion of the main vessel body 12, and the content in the main vessel body 12 is heated with the heater 16. Furthermore, an O-ring 18 is disposed in the upper end face of the main vessel body 12, and ensures airtightness inside the vessel by being placed into intimate contact with the cover 14. When the cover 14 is closed, the cover 14 is in close contact with the main vessel body 12 via the O-ring 18.

The cover 14 has a central opening and a cylindrical portion extending along the opening. A motor 20 is disposed above the cylindrical portion. A stirring device is composed of the motor 20, a stirring rod 22 connected to the rotating shaft of the motor 20, and a plurality of stirrer portions 22A extending in a direction perpendicular to the axis of the stirring rod 22. When the cover 14 is attached to the main vessel body 12, the tip of the stirring rod 22 reaches a lower region in the space inside the main vessel body 12. That is, the motor 20 being driven rotates the stirring rod 22 together with the stirrer portions 22A to stir the content in the main vessel body 12.

The cover 14 is further equipped with a first pipe 24 and a second pipe 30 that are continuous to the inside of the main vessel body 12. The first pipe 24 is connected to a hydrogen gas supply source (not shown) via a hydrogen gas supply valve 26, and to a vacuum pump (not shown) via a discharge valve 28. That is, hydrogen gas is supplied into the main vessel body 12 when the hydrogen gas supply valve 26 is open, and the main vessel body 12 is evacuated when the discharge valve 28 is open. Furthermore, the second pipe 30 is connected to a pressure gauge 32, and the pressure inside the main vessel body 12 is displayed on the pressure gauge 32.

Figure 9:
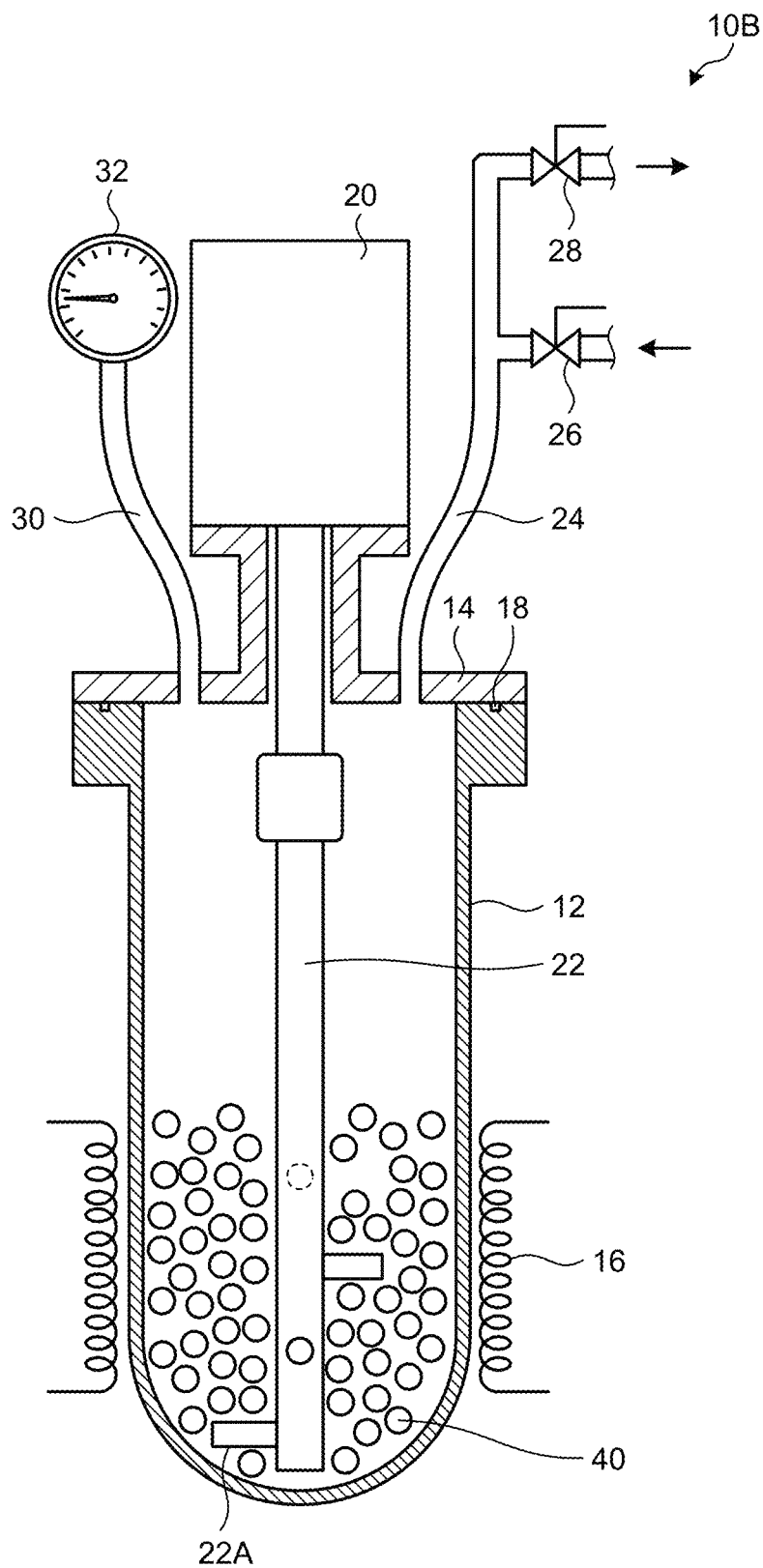
FIG. 9 is a partial sectional view illustrating another example of hermetic vessels used in an embodiment.

FIG. 9 is a partial sectional view illustrating other examples of the hermetic vessels that may be used in the present embodiment. A hermetic vessel 10B differs from the hermetic vessel in FIG. 8 in that, as illustrated in FIG. 9, the hermetic vessel 10B contains a large amount of a stirring medium 40 inside the main vessel body 12. When the ingredients are charged into the main vessel body 12 and the stirring rod 22 is rotated, the stirring medium 40 is stirred to promote the migration of the sodium borate ingredient and the sodium hydride intermediate. The amount of the stirring medium 40 may be appropriately increased or decreased so that the reaction rate will be increased.

FIG. 10A is a partial sectional view illustrating another example of the hermetic vessels that may be used in the present embodiment.

A hermetic vessel 10C differs from the hermetic vessel in FIG. 9 in that, as illustrated in FIG. 10A, the hermetic vessel 10C has a J-shaped stirrer portion 22B at the lower end of the stirring rod 22 that rotates inside the main vessel body 12. The J-shaped stirrer portion 22B is curved along the inner peripheral face of a bottom 12a of the main vessel body 12. When the ingredients are charged into the main vessel body 12 and the stirring rod 22 is rotated, the ingredients have a smaller chance of becoming attached to the inner vessel walls during stirring by virtue of the stirrer portion 22B being curved in J-shape along the inner peripheral face of the bottom 12a. A stirring medium 40 such as one illustrated in FIG. 9 may be added appropriately. In the hermetic vessel 10C as illustrated in FIG. 10B, two stirring medium 40 are added inside the main vessel body 12.

Test Examples and Comparative Examples

The present embodiment will be described in greater detail hereinbelow by presenting Test Examples that illustrate advantageous effects of the present embodiment. However, it should be construed that the present embodiment is not limited to such examples.

In the following, Test Example 1 to Test Example 18 used sodium metaborate ($NaBO_2$) powder as the sodium borate, and involved the addition of a fluoride. Comparative Example 1 reproduced Test Example 2 without the addition of a fluoride.

Here, Test Example 1 to Test Example 11 used sodium fluoride as the fluoride, and Test Example 12 to Test Example 18 used a fluoride other than sodium fluoride. Here, the fluoride used in Test Example 12 and Test Example 13 was sodium hexafluoroaluminate ($Na_3AlF_6$). Lithium fluoride (LiF) was used in Test Example 14. Potassium fluoride (KF) was used in Test Example 15. Test Example 16 and Test Example 17 used potassium aluminum fluoride ($KAlF_4$). Aluminum fluoride ($AlF_3$) was used in Test Example 18.

Test Example 19 to Test Example 22 used sodium diborate ($Na_4B_2O_5$) as the sodium borate powder, and sodium fluoride as the fluoride. Comparative Example 2 reproduced Test Example 19 without the addition of a fluoride.

Test Example 23 and Test Example 24 used sodium tetraborate ($Na_2B_4O_7$) as the sodium borate powder, and sodium fluoride as the fluoride. Comparative Example 3 reproduced Test Example 23 without the addition of a fluoride.

Test Example 25 used a combination of sodium diborate ($Na_4B_2O_5$) and sodium tetraborate ($Na_2B_4O_7$) as the sodium borate powder, and used sodium fluoride as the fluoride. Comparative Example 4 reproduced Test Example 25 without the addition of a fluoride.

Test Example 1

(a) First Step

The borate ingredient used in Test Example 1 is sodium metaborate powder.

A mixture was prepared by mixing 1.94 g of sodium metaborate that had been crushed and screened through a 100 μm opening sieve, 1.060 g of aluminum powder (average particle size: 30 μm) having a molar ratio of aluminum to boron in the above mass of sodium metaborate of 4/3 as shown in the reaction formula (7) below, and 0.826 g of sodium fluoride. At room temperature, the mixture was charged into a hermetic vessel 10A illustrated in FIG. 8. Next, the hermetic vessel was connected to a vacuum pump and evacuated, and was thereafter filled with hydrogen gas (a non-oxidizing gas).

$$4Al + 6H_2 + 3NaBO_2 \rightarrow 3NaBH_4 + 2Al_2O_3 \tag{7}$$

(c) Third Step

The inside of the hermetic vessel was heated to 470° C., and the stirring unit in the hermetic vessel was operated to stir the mixture at a rotational speed of 300 rpm. While keeping the heating temperature at 470° C., stirring was performed for 2.8 hours. At the end of the third step, the stirring was terminated when the pressure increase in the hermetic vessel ceased, and the content was cooled.

The initial hydrogen gas pressure in the above process was 0.862 MPa. When the pressure decreased to 0.45 MPa during the test, additional hydrogen gas was supplied to 0.50 MPa. The final hydrogen gas pressure was 0.483 MPa.

In the manner described above, sodium borohydride (hereinafter, also referred to as SBH) was obtained.

After completion of the third step, the reaction yield was calculated from the standard volume of hydrogen gas added, and the amount of decrease in hydrogen gas pressure. The amount of decrease was determined by subtracting the minimum pressure under the reaction conditions from the maximum gas pressure, and converting the difference into the volume (the molar amount) of hydrogen gas. As a result, the reaction yield (SBH yield) was 44.7%. The Na/B (by mol) in Test Example 1 was 1.67.

Furthermore, the content of sodium borohydride in the reaction products was determined to be 45.2% by the iodometric titration method described below. The titrated sodium borohydride yield was higher than the yield calculated from the amount of decrease in hydrogen gas, probably because more hydrogen than in the former had been available due to the generation of hydrogen gas from water that was present.

Iodometric Titration Method (1) The sample (the reaction products) was weighed out in 50 mg in a weighing bottle, and the weight was read to the first decimal place (to the 0.1 mg place).

(2) The sample weighed out in (1) was transferred to a 200 mL stoppered conical flask. 40 mL of a 20 g/L NaOH solution was added to the stoppered conical flask, and the mixture was warmed on a water bath to decompose the unreacted aluminum powder completely.

(3) The decomposition product from (2) was cooled to room temperature, and 20.0 mL of a 0.05 M iodine solution was added using a volumetric pipette. The flask was stoppered and was allowed to stand in a dark place for 15 minutes.

(4) 3 mL of hydrochloric acid was added to the flask from (3), and the flask was shaken well. The mixture was titrated with 0.1 M sodium thiosulfate.

(5) The titration was terminated when the purple color of iodine turned into colorless.

(6) A blank test was performed without the sample. The sodium borohydride content was calculated using the following equation.

Equation for calculating sodium borohydride content $$NaBH_4(\text{mass \%}) = \{(A-B) \times 0.1 \times f \times 37.83/8\}/C \times 100$$

The variables and the constants in the equation are as described below.

A: Volume (mL) of 0.1 M sodium thiosulfate solution titrated in blank test

B: Volume (mL) of 0.1 M sodium thiosulfate solution titrated to sample solution f: Factor of 0.1 M sodium thiosulfate solution C: Amount (mg) of sample weighed 37.83: Molar mass (g/mol) of sodium borohydride 8: Normality (N) of 1 mol/L sodium borohydride solution

Test Example 2

Sodium borohydride (SBH) was obtained by repeating the procedures in Test Example 1 except that at the third step in Test Example 1, the heating temperature was changed to 495° C. and the amount of stirring time was changed to 4.9 hours.

As a result, the reaction yield (SBH yield) was 59.9%. The Na/B (by mol) in Test Example 2 was 1.67.

Test Example 3

Sodium borohydride (SBH) was obtained by repeating the procedures in Test Example 1 except that at the third step in Test Example 1, the heating temperature was changed to 520° C. and the amount of stirring time was changed to 4.1 hours. The Na/B (by mol) in Test Example 3 was 1.67.

As a result, the reaction yield (SBH yield) was 56.9%.

Test Example 4

Sodium borohydride (SBH) was obtained by repeating the procedures in Test Example 1 except that at the third step in Test Example 1, the heating temperature was changed to 545° C. and the amount of stirring time was changed to 1.8 hours. The Na/B (by mol) in Test Example 4 was 1.67.

As a result, the reaction yield (SBH yield) was 54.5%.

Test Example 5

The amount of the aluminum powder ingredient in Test Example 1 was increased by 20 mass % to 1.276 g. At the third step, hydrogen gas was fed to the reaction vessel to 0.5 MPa at room temperature, and stirring was performed for 7 hours at a heating temperature of 417° C. and a stirring rate of 300 rpm. The mixture was allowed to rest and to cool to room temperature. Next, hydrogen gas was loaded to 0.5 MPa. Stirring was then performed for 7 hours at a heating temperature of 417° C. and a stirring rate of 300 rpm, and the mixture was allowed to rest again. The reaction was terminated after the same procedures were repeated one more time. At the final stage, the decrease in hydrogen gas was slow but the reaction was still occurring. After 21 hours in total of heating and stirring, sodium borohydride (SBH) was obtained. The Na/B (by mol) in Test Example 5 was 1.67, and the reaction yield (SBH yield) was 57.9%.

Test Example 6

Sodium borohydride (SBH) was obtained by repeating the procedures in Test Example 1 except that the amount of sodium fluoride added at the first step in Test Example 1 was changed to 0.206 g, and at the third step stirring was performed at a heating temperature of 520° C. for 2.8 hours. The Na/B (by mol) in Test Example 6 was 1.21.

As a result, the reaction yield (SBH yield) was 48.0%.

Test Example 7

Sodium borohydride (SBH) was obtained by repeating the procedures in Test Example 1 except that the amount of the aluminum powder ingredient in Test Example 1 was increased by 20 mass % to 1.276 g, and at the third step the heating temperature was changed to 495° C. and the amount of stirring time was changed to 13.7 hours. The Na/B (by mol) in Test Example 7 was 1.67.

As a result, the reaction yield (SBH yield) was 79.1%.

Test Example 8

Sodium borohydride (SBH) was obtained by repeating the procedures in Test Example 1 except that the amount of the aluminum powder ingredient in Test Example 1 was increased by 40 mass % to 1.470 g, and at the third step the heating temperature was changed to 495° C. and the amount of stirring time was changed to 13.3 hours. The Na/B (by mol) in Test Example 8 was 1.67.

As a result, the reaction yield (SBH yield) was 79.6%.

The sodium borohydride yield determined by the titration was 81.9%. The titrated sodium borohydride yield was higher than the yield calculated from the decrease in hydrogen gas because more hydrogen than in the calculation had been available due to the generation of hydrogen gas from water.

Test Example 9

Sodium borohydride (SBH) was obtained by repeating the procedures in Test Example 8 except that the vessel used in Test Example 8 was replaced by a hermetic vessel 10C illustrated in FIG. 10B, which contained two columnar balls (diameter: 10 mm, length: 10 mm, material: alumina ceramic) as a stirring medium 40, and stirring was performed at a heating temperature of 495° C. for 5 hours. The Na/B (by mol) in Test Example 9 was 1.67. As a result, the reaction yield (SBH yield) was 77.9%.

Test Example 10

Sodium borohydride (SBH) was obtained by repeating the procedures in Test Example 1 except that the amount of the sodium fluoride ingredient in Test Example 1 was increased to 1.65 g, and at the third step the heating temperature was changed to 520° C. and the amount of stirring time was changed to 3.2 hours. The Na/B (by mol) in Test Example 10 was 2.33. As a result, the reaction yield (SBH yield) was 60.8%.

Test Example 11

Sodium borohydride (SBH) was obtained by repeating the procedures in Test Example 1 except that the amount of the aluminum powder ingredient in Test Example 1 was increased by 60 mass % to 1.680 g, and at the third step the heating temperature was changed to 495° C. and the amount of stirring time was changed to 14.9 hours. The Na/B (by mol) in Test Example 11 was 2.36. As a result, the reaction yield (SBH yield) was 82.8%.

Test Example 12

Sodium borohydride (SBH) was obtained by repeating the procedures in Test Example 1 except that sodium fluoride at the first step in Test Example 1 was replaced by 1.376 g of sodium hexafluoroaluminate ($Na_3AlF_6$), and at the third step the heating temperature was changed to 495° C. and the amount of stirring time was changed to 11 hours. The Na/B (by mol) in Test Example 12 was 1.67. As a result, the reaction yield (SBH yield) was 62.4%.

Test Example 13

Sodium borohydride (SBH) was obtained by repeating the procedures in Test Example 14 except that the amount of the aluminum powder ingredient in Test Example 12 was increased by 20 mass % to 1.276 g, and at the third step the heating temperature was changed to 499° C. and the amount of stirring time was changed to 7.44 hours. The Na/B (by mol) in Test Example 13 was 1.67. As a result, the reaction yield (SBH yield) was 63.0%.

Test Example 14

Sodium borohydride (SBH) was obtained by repeating the procedures in Test Example 1 except that sodium fluoride used at the first step in Test Example 1 was replaced by 0.53 g of lithium fluoride (LiF), and at the third step the heating temperature was changed to 500° C. and the amount of stirring time was changed to 9.95 hours. The Na/B (by mol) in Test Example 14 was 1.69. As a result, the reaction yield (SBH yield) was 61.3%.

Test Example 15

Sodium borohydride (SBH) was obtained by repeating the procedures in Test Example 1 except that sodium fluoride used at the first step in Test Example 1 was replaced by 1.142 g of potassium fluoride (KF), and at the third step the heating temperature was changed to 495° C. and the amount of stirring time was changed to 10 hours. The Na/B (by mol) in Test Example 15 was 1.67. As a result, the reaction yield (SBH yield) was 48.0%.

Test Example 16

At the first step in Test Example 1, sodium fluoride was replaced by 0.93 g of potassium aluminum fluoride ($KAlF_4$), and the mixture at the third step was stirred at a heating temperature of 495° C. for 5.2 hours and was allowed to rest and to cool to room temperature without heating and stirring. In this process, the initial hydrogen gas pressure at room temperature was 0.5 MPa at the time of the introduction of hydrogen gas, the maximum pressure after heating at 495° C. was 0.927 MPa, the pressure before the rest was 0.57 MPa, and the pressure when the mixture returned to room temperature was 0.32 MPa. Thereafter, hydrogen gas was fed to 0.5 MPa at room temperature, and stirring was performed at a heating temperature of 495° C. for 3.5 hours. The decrease in hydrogen gas pressure substantially ceased after this stirring, and the test was terminated. Sodium borohydride (SBH) was thus obtained. The hydrogen gas pressure during the test after the rest was 0.874 MPa at maximum and 0.704 MPa at the end of the test. The Na/B (by mol) in Test Example 16 was 1.22. As a result, the reaction yield (SBH yield) was 54.2%.

Test Example 17

At the first step in Test Example 16, 0.05 g of potassium aluminum fluoride (KAlF$_4$) was added, and at the third step stirring was performed at a heating temperature of 560° C. for 1.6 hours. The operation was discontinued when the decrease in hydrogen gas pressure had substantially ceased. Sodium borohydride (SBH) was thus obtained. The hydrogen gas pressure in the reaction vessel during the test was 1.07 MPa at maximum and 0.72 MPa at the end of the test. The Na/B (by mol) in Test Example 17 was 1.01. As a result, the reaction yield (SBH yield) was 31.6%.

Test Example 18

Sodium borohydride (SBH) was obtained by repeating the procedures in Test Example 1 except that sodium fluoride at the first step in Test Example 1 was replaced by 0.55 g of aluminum fluoride (AlF$_3$), and at the third step the heating temperature was changed to 495° C. and the amount of stirring time was changed to 9 hours. The Na/B (by mol) in Test Example 18 was 1.00. As a result, the reaction yield (SBH yield) was 35.3%.

These results are listed in Table 2.

Comparative Example 1

Sodium borohydride (SBH) was obtained by repeating the procedures in Test Example 2 except that the first step in Test Example 2 did not involve the addition of sodium fluoride and involved 1.940 g of sodium metaborate powder as the borate ingredient, and heating was performed at a heating temperature of 495° C. for 8.7 hours. The Na/B (by mol) in Comparative Example 1 was 1.00. As a result, the reaction yield (SBH yield) was 27.3%.

involved the addition of a fluoride resulted in good reaction yields higher than the reaction yield in Comparative Example 1 (27.3%).

When, in particular, sodium fluoride was used as the fluoride, as illustrated in FIG. 11, Test Example 8 attained a marked enhancement in reaction yield over Test Example 2 as a result of the amount of the aluminum powder being increased by 40 mass % compared to Test Example 2. Furthermore, Test Example 11 attained a marked enhancement in reaction yield over Test Example 2 as a result of the amount of the aluminum powder being increased by 60 mass % compared to Test Example 2.

When the reaction temperature was changed to 470° C. (Test Example 1), 495° C. (Test Example 2), 520° C. (Test Example 3), and 545° C. (Test Example 4), as illustrated in FIG. 12, a good reaction yield was obtained at a reaction temperature of below 500° C. and near 495° C.

Furthermore, as shown in Test Example 12 to Test Example 18 in Table 1, good reaction yields were obtained even when the fluoride is a fluoride other than sodium fluoride. In particular, sodium hexafluoroaluminate (Na$_3$AlF$_6$), potassium fluoride (KF), potassium aluminum fluoride (KAlF$_4$) and lithium fluoride (LiF) used as the fluorides offered as good a reaction yield as when sodium fluoride was used.

Test Example 19

At the first step in Test Example 1, 2.942 g of sodium diborate powder was used as the borate ingredient, and 0.825 g of sodium fluoride was admixed therewith.

At the second step, the hermetic vessel that had been evacuated was brought to 400° C., and thereby water attached to the sodium diborate and the aluminum powder, and water of hydration in the sodium diborate were released

TABLE 2

| Test Examples | Ingredient [g] Al | Borate ingredients [g] | | | Additive [g] | Temp. [° C.] | Hydrogen gas pressure [MPa] Maximum-Final | Reaction yield [%] | Na/B [by mol] |
|---|---|---|---|---|---|---|---|---|---|
| | | NaBO$_2$ | Na$_2$B$_4$O$_7$ | Na$_4$B$_2$O$_5$ | | | | | |
| Test Ex. 1 | 1.060 | 1.940 | — | — | NaF: 0.826 | 470 | 0.862-0.483 | 44.7 | 1.67 |
| Test Ex. 2 | 1.060 | 1.940 | — | — | NaF: 0.826 | 495 | 0.872-0.489 | 59.9 | 1.67 |
| Test Ex. 3 | 1.060 | 1.940 | — | — | NaF: 0.826 | 520 | 0.896-0.493 | 56.9 | 1.67 |
| Test Ex. 4 | 1.060 | 1.940 | — | — | NaF: 0.826 | 545 | 0.918-0.468 | 54.5 | 1.67 |
| Test Ex. 5 | 1.276 | 1.944 | — | — | NaF: 0.824 | 417 | 0.8-0.5 | 57.9 | 1.67 |
| Test Ex. 6 | 1.060 | 1.940 | — | — | NaF: 0.206 | 520 | 0.925-0.483 | 48.0 | 1.21 |
| Test Ex. 7 | 1.276 | 1.940 | — | — | NaF: 0.826 | 495 | 0.893-0.554 | 79.1 | 1.67 |
| Test Ex. 8 | 1.470 | 1.940 | — | — | NaF: 0.826 | 495 | 0.882-0.478 | 79.6 | 1.67 |
| Test Ex. 9 | 1.480 | 1.940 | — | — | NaF: 0.826 | 495 | 0.887-0.727 | 77.9 | 1.67 |
| Test Ex. 10 | 1.060 | 1.940 | — | — | NaF: 1.65 | 520 | 0.883-0.487 | 60.8 | 2.33 |
| Test Ex. 11 | 1.680 | 1.940 | — | — | NaF: 1.65 | 495 | 0.903-0.627 | 82.8 | 2.36 |
| Test Ex. 12 | 1.060 | 1.940 | — | — | Na$_3$AlF$_6$: 1.376 g | 495 | 0.885-0.707 | 62.4 | 1.67 |
| Test Ex. 13 | 1.270 | 1.940 | — | — | Na$_3$AlF$_6$: 1.376 g | 499 | 0.896-0.705 | 63.0 | 1.67 |
| Test Ex. 14 | 1.060 | 1.940 | — | — | LiF: 0.53 g | 500 | 0.883-0.716 | 61.3 | 1.69 |
| Test Ex. 15 | 1.060 | 1.940 | — | — | KF: 1.142 g | 495 | 0.927-0.701 | 48.0 | 1.67 |
| Test Ex. 16 | 1.060 | 1.940 | — | — | KAlF$_4$: 0.93 g | 495 | 0.927-0.698 | 54.2 | 1.22 |
| Test Ex. 17 | 1.070 | 1.950 | — | — | KAlF$_4$: 0.05 g | 560 | 1.07-0.72 | 31.6 | 1.01 |
| Test Ex. 18 | 1.061 | 1.942 | — | — | AlF$_3$: 0.55 g | 495 | 0.885-0.772 | 35.3 | 1.00 |
| Comp. Ex. 1 | 1.060 | 1.940 | — | — | — | 495 | 0.877-0.68 | 27.3 | 1.00 |

As listed in Table 2, the reaction yield at a reaction temperature of 495° C. was low in Comparative Example 1 in which sodium borohydride was produced using sodium metaborate as the sodium borate without the addition of a fluoride. In contrast, Test Example 1 to Test Example 18 that and vaporized. This vacuum heating at 400° C. was performed for 4 hours and removed water (to 1 Torr). Thereafter, the third step was performed by repeating the procedures in Test Example 1 except that heating was performed in the hermetic vessel at a heating temperature of 495° C. for 14.5 hours while operating the stirring unit. Sodium borohydride (SBH) was thus obtained. The Na/B (by mol) in Test Example 19 was 2.65.

As a result, the reaction yield (SBH yield) was 99.5%.

Test Example 20

Sodium borohydride (SBH) was obtained by repeating the procedures in Test Example 19 except that the pressure at the third step in Test Example 19 was changed to a lower pressure (0.12 MPa) and heating was performed at a heating temperature of 501° C. for 3 hours. The Na/B (by mol) in Test Example 20 was 2.65.

As a result, the reaction yield (SBH yield) was 31.1%.

Test Example 21

Sodium borohydride (SBH) was obtained by repeating the procedures in Test Example 19 except that at the third step in Test Example 19, heating was performed at a heating temperature of 518° C. for 14.2 hours. The Na/B (by mol) in Test Example 21 was 2.65.

As a result, the reaction yield (SBH yield) was 95.0%.

Test Example 22

Sodium borohydride (SBH) was obtained by repeating the procedures in Test Example 19 except that the amount of the sodium fluoride ingredient in Test Example 19 was increased to 2.48 g, and at the third step the heating temperature was changed to 501° C. and the amount of stirring time was changed to 14 hours. The Na/B (by mol) in Test Example 22 was 3.94.

As a result, the reaction yield (SBH yield) was 93.3%.

Comparative Example 2

Sodium borohydride (SBH) was obtained by repeating the procedures in Test Example 19 except that the first step in Test Example 19 did not involve the addition of sodium fluoride and involved 2.940 g of sodium diborate powder as the borate ingredient, and heating was performed at a heating temperature of 495° C. for 7.08 hours. The Na/B (by mol) in Comparative Example 2 was 2.00.

As a result, the reaction yield (SBH yield) was 60.4%.
These results are listed in Table 3.

The results obtained when sodium fluoride was added to sodium metaborate and to sodium diborate will be discussed. As illustrated in FIG. 13, Test Example 19 that used sodium diborate resulted in a reaction yield of 99.5%, very close to 100%, and outperformed Test Example 2 and Test Example 7 each using sodium metaborate. The reaction yield of sodium borohydride was markedly enhanced by using sodium diborate in place of sodium metaborate.

Here, the results of SEM mapping analysis at the completion of the reaction in Test Example 19 are shown as a backscattered electron image in FIG. 15A and as a fluorine mapping analysis image in FIG. 15B. FIG. 15A is a SEM backscattered electron image of the products at the completion of the reaction (99.5% SBH conversion) in Test Example 19. FIG. 15B is a fluorine mapping FKα X-ray image by SEM.

As illustrated in FIG. 15A, the entirety is substantially uniformly gray showing substantially uniform distribution of the compounds formed, except for local SBH segregations appearing in dark gray. However, as illustrated in the fluorine mapping analysis image in FIG. 15B, fluorine is unevenly distributed, forming a NaF layer around the aluminum particles.

Test Example 23

Sodium borohydride (SBH) was obtained by repeating the procedures in Test Example 1 except that at the first step in Test Example 1, 1.484 g of sodium tetraborate powder as the borate ingredient was admixed with 0.414 g of sodium fluoride, and heating was performed at a heating temperature of 500° C. for 13 hours. The Na/B (by mol) in Test Example 23 was 0.88. As a result, the reaction yield (SBH yield) was 42.6%.

Test Example 24

Sodium borohydride (SBH) was obtained by repeating the procedures in Test Example 23 except that the amount of the sodium fluoride ingredient in Test Example 23 was increased to 0.826 g, and at the third step the heating temperature was changed to 501° C. and the amount of stirring time was changed to 14 hours. The Na/B (by mol) in Test Example 24 was 1.17. As a result, the reaction yield (SBH yield) was 83.9%.

TABLE 3

| Test Examples | Ingredient [g] Al | Borate ingredients [g] NaBO$_2$ | Na$_2$B$_4$O$_7$ | Na$_4$B$_2$O$_5$ | Additive [g] | Temp. [° C.] | Hydrogen gas pressure [MPa] Maximum-Final | Reaction yield [%] | Na/B [by mol] |
|---|---|---|---|---|---|---|---|---|---|
| Test Ex. 19 | 1.280 | — | — | 2.942 | NaF: 0.825 g | 495 | 0.848-0.606 | 99.5 | 2.65 |
| Test Ex. 20 | 1.272 | — | — | 2.942 | NaF: 0.826 g | 501 | 0.133-0.12 | 31.1 | 2.65 |
| Test Ex. 21 | 1.280 | — | — | 2.942 | NaF: 0.826 g | 518 | 0.917-0.668 | 95.0 | 2.65 |
| Test Ex. 22 | 1.270 | — | — | 2.942 | NaF: 2.48 g | 501 | 0.893-0.635 | 93.3 | 3.94 |
| Comp. Ex. 2 | 1.060 | — | — | 2.940 | — | 495 | 0.892-0.649 | 60.4 | 2.00 |

As listed in Table 3, the reaction yield at a reaction temperature of 495° C. was 60.4% in Comparative Example 2 in which sodium borohydride was produced using sodium diborate as the sodium borate without the addition of a fluoride. In contrast, Test Example 19, Test Example 21 and Test Example 22 that involved the addition of a fluoride resulted in good reaction yields higher than the above.

Comparative Example 3

Sodium borohydride (SBH) was obtained by repeating the procedures in Test Example 23 except that the first step in Test Example 23 did not involve the addition of sodium fluoride and involved 1.980 g of sodium tetraborate powder as the borate ingredient, and heating was performed at a heating temperature of 514° C. for 2.49 hours. The Na/B (by mol) in Comparative Example 3 was 0.5. As a result, the reaction yield (SBH yield) was 4.8%.

These results are listed in Table 4.

tetraborate and Test Example 19 using sodium diborate. This confirms the effects of the addition of sodium diborate to sodium tetraborate.

TABLE 4

| Test Examples | Ingredient [g] Al | Borate ingredients [g] | | | Additive [g] | Temp. [° C.] | Hydrogen gas pressure [MPa] Maximum-Final | Reaction yield [%] | Na/B [by mol] |
|---|---|---|---|---|---|---|---|---|---|
| | | NaBO$_2$ | Na$_2$B$_4$O$_7$ | Na$_4$B$_2$O$_5$ | | | | | |
| Test Ex. 23 | 1.270 | — | 1.484 | — | NaF: 0.414 g | 500 | 0.872-0.641 | 42.6 | 0.88 |
| Test Ex. 24 | 1.270 | — | 1.484 | — | NaF: 0.826 g | 501 | 0.872-0.641 | 83.9 | 1.17 |
| Comp. Ex. 3 | 1.060 | — | 1.980 | — | — | 514 | 0.858-0.815 | 4.8 | 0.5 |

As listed in Table 4, the reaction yield at a reaction temperature of 514° C. was 4.8% in Comparative Example 3 in which sodium borohydride was produced using sodium tetraborate as the sodium borate without the addition of a fluoride.

In contrast, Test Example 23 and Test Example 24 that involved the addition of a fluoride resulted in good reaction yields higher than the above. Furthermore, a marked enhancement in reaction yield was achieved by the increase in Na/B (by mol) stemming from the use of a larger amount of sodium fluoride.

Test Example 25

Sodium borohydride (SBH) was obtained by repeating the procedures in Test Example 1 except that the first step in Test Example 1 involved 0.975 g of sodium tetraborate powder and 0.990 g of sodium diborate powder as the borate ingredients, and 0.826 g of sodium fluoride, and heating was performed at a heating temperature of 501° C. for 14 hours. The Na/B (by mol) in Test Example 25 was 1.68. As a result, the reaction yield (SBH yield) was 94.4%.

Comparative Example 4

Sodium borohydride (SBH) was obtained by repeating the procedures in Test Example 25 except that the first step in Test Example 25 did not involve the addition of sodium fluoride. The Na/B (by mol) in Comparative Example 4 was 1.02.

As a result, the reaction yield (SBH yield) was 37.5%.

These results are listed in Table 5.

REFERENCE SIGNS LIST 10A, 10B, 10C HERMETIC VESSEL
12 MAIN VESSEL BODY
14 COVER
16 HEATER
18 O-RING
20 MOTOR
22 STIRRING ROD
22A STIRRER PORTION
22B J-SHAPED STIRRER PORTION
24 FIRST PIPE
26 HYDROGEN GAS SUPPLY VALVE
28 DISCHARGE VALVE
30 SECOND PIPE
32 PRESSURE GAUGE
40 STIRRING MEDIUM
51 SODIUM BORATE
52 ALUMINUM POWDER
53 NON-OXIDIZING GAS
54 FLUORIDE
101 ALUMINUM PARTICLE
102A DENSE OXIDE FILM
102B STRONG OXIDE FILM
105 SODIUM OXIDE (Na$_2$O)
108 HARD SHELL
109 METALLIC SODIUM (Na)
110 SODIUM HYDRIDE (NaH)
111 DIBORON TRIOXIDE (B$_2$O$_3$)
112 SODIUM BOROHYDRIDE (SBH)
120 SODIUM FLUORIDE (NaF)

TABLE 5

| Test Examples | Ingredient [g] Al | Borate ingredients [g] | | | Additive [g] | Temp. [° C.] | Hydrogen gas pressure [MPa] Maximum-Final | Reaction yield [%] | Na/B [by mol] |
|---|---|---|---|---|---|---|---|---|---|
| | | NaBO$_2$ | Na$_2$B$_4$O$_7$ | Na$_4$B$_2$O$_5$ | | | | | |
| Test Ex. 25 | 1.274 | — | 0.975 | 0.990 | NaF: 0.826 g | 501 | 0.853-0.630 | 94.4 | 1.68 |
| Comp. Ex. 4 | 1.270 | — | 0.975 | 0.990 | — | 495 | 0.887-0.735 | 37.5 | 1.02 |

As listed in Table 5, the reaction yield was 37.5% in Comparative Example 4 that did not involve the addition of a fluoride. In contrast, Test Example 25 that involved the addition of a fluoride attained a good reaction yield higher than the above.

Furthermore, as illustrated in FIG. 14, Test Example 25, which combined sodium diborate and sodium tetraborate, falls in the middle between Test Example 24 using sodium 121 ALUMINUM FLUORIDE (AlF$_3$)
122 SODIUM FLUORIDE-ALUMINUM FLUORIDE LAYER

The invention claimed is:

1. A sodium borohydride production method comprising:
mixing a sodium borate, aluminum powder and powder of a fluoride together in a hermetic vessel filled with hydrogen gas, and reacting the mixture at not less than 410° C. and not more than 560° C.

2. The sodium borohydride production method according to claim 1, wherein the sodium borate is one or more selected from sodium metaborate, sodium tetraborate and sodium diborate.

3. The sodium borohydride production method according to claim 1, wherein the fluoride is one or more selected from sodium fluoride (NaF), sodium hexafluoroaluminate ($Na_3AlF_6$), potassium fluoride (KF), potassium aluminum fluoride ($KAlF_4$), aluminum fluoride ($AlF_3$) and lithium fluoride (LiF).

4. The sodium borohydride production method according to claim 1, wherein a molar ratio of aluminum in the aluminum powder to boron in the sodium borate is not less than 4/3.

5. The sodium borohydride production method according to claim 1, wherein a molar ratio of any alkali metal plus sodium in the sodium borate to boron in the sodium borate is in a range of more than 1 and not more than 4.

6. The sodium borohydride production method according to claim 2, wherein the fluoride is one or more selected from sodium fluoride (NaF), sodium hexafluoroaluminate ($Na_3AlF_6$), potassium fluoride (KF), potassium aluminum fluoride ($KAlF_4$), aluminum fluoride ($AlF_3$) and lithium fluoride (LiF).

7. The sodium borohydride production method according to claim 2, wherein a molar ratio of aluminum in the aluminum powder to boron in the sodium borate is not less than 4/3.

8. The sodium borohydride production method according to claim 3, wherein a molar ratio of aluminum in the aluminum powder to boron in the sodium borate is not less than 4/3.

9. The sodium borohydride production method according to claim 6, wherein a molar ratio of aluminum in the aluminum powder to boron in the sodium borate is not less than 4/3.

10. The sodium borohydride production method according to claim 2, wherein a molar ratio of any alkali metal plus sodium in the sodium borate to boron in the sodium borate is in a range of more than 1 and not more than 4.

11. The sodium borohydride production method according to claim 3, wherein a molar ratio of any alkali metal plus sodium in the sodium borate to boron in the sodium borate is in a range of more than 1 and not more than 4.

12. The sodium borohydride production method according to claim 4, wherein a molar ratio of any alkali metal plus sodium in the sodium borate to boron in the sodium borate is in a range of more than 1 and not more than 4.

13. The sodium borohydride production method according to claim 6, wherein a molar ratio of any alkali metal plus sodium in the sodium borate to boron in the sodium borate is in a range of more than 1 and not more than 4.

14. The sodium borohydride production method according to claim 7, wherein a molar ratio of any alkali metal plus sodium in the sodium borate to boron in the sodium borate is in a range of more than 1 and not more than 4.

15. The sodium borohydride production method according to claim 8, wherein a molar ratio of any alkali metal plus sodium in the sodium borate to boron in the sodium borate is in a range of more than 1 and not more than 4.

16. The sodium borohydride production method according to claim 9, wherein a molar ratio of any alkali metal plus sodium in the sodium borate to boron in the sodium borate is in a range of more than 1 and not more than 4.

* * * * *